United States Patent
Cohen et al.

(10) Patent No.: US 7,945,470 B1
(45) Date of Patent: *May 17, 2011

(54) FACILITATING PERFORMANCE OF SUBMITTED TASKS BY MOBILE TASK PERFORMERS

(75) Inventors: Peter D. Cohen, Seattle, WA (US); Glenn A. Dierkes, Mercer Island, WA (US); Adam D. Bradley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 792 days.

This patent is subject to a terminal disclaimer.

(21) Appl. No.: 11/537,494

(22) Filed: Sep. 29, 2006

(51) Int. Cl.
*G06F 17/00* (2006.01)
*G06F 15/02* (2006.01)

(52) U.S. Cl. ............ 705/9; 707/600; 707/805; 709/201; 455/433

(58) Field of Classification Search .................... 707/10, 707/100, 102, 104.1, 200, 101, 764, 770, 707/821, 600, 607, 802, 805, 919, 920, 921, 707/999.107; 705/1, 7, 8, 9, 1.1; 718/100, 718/101, 102; 709/203, 201, 205, 220, 228, 709/219; 455/404.2, 414.3, 433
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |

(Continued)

OTHER PUBLICATIONS

"About Spending," retrieved Nov. 23, 2004, from http://www.mypoints.com/mp/dstatial.show?isref=nmhp.popup.aboutspending.default, 1 page.

(Continued)

*Primary Examiner* — Greta L Robinson
(74) *Attorney, Agent, or Firm* — Seed IP Law Group PLLC

(57) ABSTRACT

Techniques are described for facilitating performance of tasks supplied by task requesters, such as by a task exchange server interacting with mobile task performer users available to perform tasks at various geographical locations. Some or all of the tasks may each be associated with geographical locations and/or other device-related criteria related to the performance of the task, and one or more mobile task performer users may be identified as being appropriate to perform the task based on the location of, qualifications of, and/or characteristics of mobile device(s) of the user. Such identified task performer users may then be notified of such appropriate tasks in various ways, such as by sending one or more electronic messages with information about the tasks to one or more mobile devices of the users, and may in some situations use one or more of their mobile devices as part of the task performance.

55 Claims, 10 Drawing Sheets

U.S. PATENT DOCUMENTS

| | | | | |
|---|---|---|---|---|
| 6,199,099 | B1* | 3/2001 | Gershman et al. | 709/203 |
| 6,223,165 | B1 | 4/2001 | Lauffer | 705/8 |
| 6,289,340 | B1* | 9/2001 | Puram et al. | 1/1 |
| 6,393,497 | B1 | 5/2002 | Arnold et al. | 709/330 |
| 6,539,377 | B1 | 3/2003 | Culliss | 707/5 |
| 6,546,087 | B2 | 4/2003 | Shaffer et al. | 379/90.01 |
| 6,584,192 | B1 | 6/2003 | Agusta | 379/265.12 |
| 6,584,464 | B1 | 6/2003 | Warthen | 707/4 |
| 6,587,556 | B1 | 7/2003 | Judkins et al. | 379/219 |
| 6,603,854 | B1 | 8/2003 | Judkins et al. | 379/265.06 |
| 6,636,590 | B1 | 10/2003 | Jacob et al. | 379/114.05 |
| 6,704,403 | B2 | 3/2004 | Lurie et al. | 379/114.1 |
| 6,707,904 | B1 | 3/2004 | Judkins et al. | 379/265.06 |
| 6,763,104 | B1 | 7/2004 | Judkins et al. | 379/265 |
| 6,859,523 | B1 | 2/2005 | Jilk et al. | 379/32.01 |
| 6,938,048 | B1 | 8/2005 | Jilk et al. | 707/102 |
| 7,020,468 | B2* | 3/2006 | Squibbs et al. | 455/445 |
| 7,155,400 | B1 | 12/2006 | Jilk et al. | 705/9 |
| 7,197,459 | B1 | 3/2007 | Harinarayan et al. | 704/270.1 |
| 7,395,536 | B2* | 7/2008 | Verbeke et al. | 718/100 |
| 2001/0047286 | A1* | 11/2001 | Walker et al. | 705/9 |
| 2002/0069079 | A1 | 6/2002 | Vega | 705/1 |
| 2002/0083079 | A1 | 6/2002 | Meier et al. | 707/104.1 |
| 2003/0078852 | A1 | 4/2003 | Shoen et al. | 705/26 |
| 2003/0200156 | A1 | 10/2003 | Roseman et al. | 705/27 |
| 2003/0204449 | A1 | 10/2003 | Kotas et al. | 705/27 |
| 2004/0098447 | A1* | 5/2004 | Verbeke et al. | 709/201 |
| 2005/0216560 | A1* | 9/2005 | Pohja et al. | 709/205 |
| 2005/0240561 | A1* | 10/2005 | Jain et al. | 707/1 |
| 2006/0059490 | A1* | 3/2006 | Knapp et al. | 718/100 |
| 2006/0106774 | A1* | 5/2006 | Cohen et al. | 707/3 |
| 2007/0073570 | A1* | 3/2007 | Montagut | 705/8 |
| 2007/0168471 | A1* | 7/2007 | Childress et al. | 709/220 |

OTHER PUBLICATIONS

"Earning Points with MyPoints," retrieved Nov. 23, 2004, from http://www.mypoints.com/mp/dstatial.show?isref=nmhp.popup.aboutearning.default, 1 page.

"FAQs," retrieved Nov. 23, 2004, from http://www.mypoints.com/mp/dstatial.show?isref=nmhp.popup.faq.default, 1 page.

"Frequently Asked Questions about the Open Mind Initiative," retrieved Nov. 16, 2004, from http://www.openmind.org/FAQs.html, 3 pages.

"Frequently Asked Questions," TrueDater FAQ's, retrieved Apr. 4, 2005, from http://www.truedater.com/index.php?action=faqs, 2 pages.

"Grid—The Competitive Advantage," Aug. 2004, retrieved Jun. 9, 2005, from http://www.sun.com/solutions/documents/articles/grid_adv_aa.xml?null, 2 pages.

"Join MyPoints Now," retrieved Nov. 23, 2004, from http://www.mypoints.com/?MCK=ccb67d8c41a3819b, 4 pages.

"Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcf110252bb3f7/fflc8, 3 pages.

"The ESP Game," retrieved Jun. 8, 2005, from http://www.espgame.org, 1 page.

"What is BonusMail®?," retrieved Nov. 23, 2004, from http://www.mypoints.com/mp/dstatial.show?isref=nmhp.popup.bonusmail.default, 1 page.

"What is Keen," retrieved Jun. 8, 2005, from http://www.keen.com/documents/homepage/wik_pop.asp?TID=gbFQnFLPstnUuFonMtBmHw, 1 page.

"What is MyPoints," retrieved Nov. 23, 2004, from http://www.mypoints.com/mp/dstatial.show?isref=nmhp.popup.whatis.default, 1 page.

About, Inc., "Intelligent Agents," retrieved Jun. 9, 2005, from http://psychology.about.com./od/intelligentagents/, 5 pages.

About, Inc., "Our Story," retrieved Jun. 9, 2005, from http://ourstory.about.com/, 2 pages.

About, Inc., Welcome to About.com, retrieved Jun. 9, 2005, from http://www.about.com, 2 pages.

Applied Skills & Knowledge, LLC, "Make Skills-Based Routing Happen," Jun. 3, 2003, retrieved from http://www.appliedskills.com/whitepapers/files/Skills-basedRouting.pdf, 3 pages.

Barlas, D., "Hipbone Connects to Kana," Jan. 5, 2004, retrieved Jun. 8, 2005, from http://www.line56.com/print/default.asp?ArticleID=5255, 1 page.

Calishain, T., "Yahoo! Service Offers More Advice than Expertise," May 6, 2002, retrieved Jul. 16, 2004, from http://www.infotoday.com/newsbreaks/nb020506-1.htm, 2 pages.

distributed.net, "distributed.net History & Timeline," retrieved Jun. 8, 2005, from http://www.distributed.net/history.php, 7 pages.

distributed.net, "The Organization," retrieved Jun. 8, 2005, from http://www.distributed.net/, 2 pages.

Doan, A., "MongoMusic Fans Include Microsoft," Sep. 9, 2000, Forbes.com, retrieved Jun. 9, 2005, from http://www.forbes.com/2000/09/09/feat2.html, 3 pages.

DuBaud, S., "Advice Site Resort to Legal Counsel," Jan. 4, 2002, retrieved Apr. 29, 2004, from http://news.com.com/2011-1088-801359.html, 3 pages.

Elance Inc., Elance *Online*™—Everyday Outsourcing™, retrieved Jun. 9, 2005, from http://www.elance.com/c/static/main/displayhtml.pl?file=eol.html&module=home, 2 pages.

Elance, Inc., "Elance History," retrieved Jun. 8, 2005, from http://www.elance.com/c/static/main/displayhtml.pl?file=heritage.html, 3 pages.

eLancer homepage, retrieved Jun. 8, 2005, from http://www.elancer.us/, 2 pages.

Epinions, Inc., Epinions.com homepage, retrieved Jun. 9, 2005, from http://www.epinions.com, 2 pages.

Fox, S., "Can New Technology Revolutionize the Net?," Jun. 1, 2000, CNET.com, retrieved Jun. 8, 2005, from http://web.archive.org/web/20001018221958/www.cnet.com/insider/0-121949-7-1995365.html, pp. 1-3, 3 pages.

Get a Freelancer.com homepage, retrieved Jun. 8, 2005, from http://www.getafreelancer.com, 3 pages.

gonesilent.com homepage, Aug. 22, 2000, retrieved Jun. 8, 2005, from http://web.archive.org/web/20000822122731/www.gonesilent.com/about.html, 2 pages.

Google—Answers, "Ask a question, Set your Price. Get your Answer.," retrieved Jun. 9, 2005, from http://answers.google.com/answers/, 1 page.

Google, "Your Computer's Idle Time is too Precious to Waste," retrieved Jun. 9, 2005, from http://toolbar.google.com/dc/offerdc.html, 1 page.

Gunn, S., "Hey, buddy, can you spare some cycles?," Sep. 24, 1997, retrieved Jun. 8, 2005, from http://www.cnn.com/TECH/9709/24/netly.news/, 4 pages.

Hagel, J. et al., "Go Slowly with Web Services," Feb. 15, 2002, CIO.com retrieved from http://www.cio.com/archive/021502/keynote.html, 4 pages.

Hagel, J., et al., "Your Next IT Strategy," *Harvard Business Review R0109G*:105-113, Oct. 2001, 11 pages.

Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.

Ingenio, Inc., Ingenio™ homepage, retrieved Jun. 8, 2005, from http://www.ingenio.com/default.asp?TF=1, 2 pages.

Ingenio, Inc., Introducing Ingenio™ Pay Per Call™, retrieved Jun. 8, 2005, from http://www.ingenio.com/documents/corp/home.asp, 2 pages.

Ingenio, Inc., KEEN—Your Personal Advisor, retrieved Jun. 8, 2005, from http://www.keen.com, 2 pages.

Ingenio, Inc., KEEN—Your Personal Advisor/Get Advice, retrieved Jun. 8, 2005, from http://www.keen.com/categories/get_answers.asp?SRCHT=0&search=&gid=0, 1 page.

Jupitermedia Corporation, "About jGuru.com: Overview," retrieved Jun. 9, 2005, from http://www.jguru.com/misc/about-overview.jsp, 2 pages.

Jupitermedia Corportion, jGuru homepage, retrieved Jun. 9, 2005, from http://www.jguru.com, 5 pages.

Kana Inc., "Corporate Overview," retrieved Jun. 8, 2005, from http://www.kana.com/about/about.aspx, 2 pages.

Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.

Kenexa, "Call Centers," retrieved Jun. 8, 2005, from http://www.kenexa.com/ind_callcent.html, 3 pages.

Lynn, R., "Keeping Online Daters Honest," Apr. 1, 2005, retrieved on Apr. 4, 2005, from http://www.wired.com/news/print/0,1294,67083,00.html, 3 pages.

Massive Multiplayer Online Role-Playing Game—homepage, retrieved Jun. 8, 2005, from http://www.mpog.com, 2 pages.

Microsoft Corporation, "Microsoft Acquires MongoMusic," Sep. 13, 2000, retrieved Jun. 9, 2005, from http://www.microsoft.com/presspass/press/2000/sept00/mongopr.mspx, 2 pages.

Mori, G., et al., "Breaking a Visual CAPTCHA," retrieved Jun. 8, 2005, from http://www.cs.berkeley.edu/~mori/gimpy/gimpy.html, 4 pages.

Mossberg, W., "GuruNet as a Reference Tool Goes Beyond Search Engines," Mar. 6, 2003, retrieved Jul. 20, 2004, from http://ptech.wsj.com/archive/ptech-20030306.html, 3 pages.

Multiplayer Online Games Directory—homepage, retrieved Jun. 8, 2005, from http://www.mpogd.com, 1 page.

Nortel Networks, "Beyond ACD- The advantages of Skill-based Routing in Today's Contact Centers," Mar. 7, 2003, retrieved from http://www.nortelnetworks.com/solutions/ccvp/collateral/nn103640-030703.pdf, 12 pages.

Online Multiplayer Games Network—homepage, retrieved Jun. 8, 2005, from http://www.omgn.com, 2 pages.

Project Gutenberg's Distributed Proofreaders—homepage, retrieved Jun. 9, 2005 from http://www.pgdp.net/c/default.php, 4 pages.

Rhodes, B., "The Wearable Remembrance Agent: A System for Augmented Memory," Appeared in *Personal Technologies Journal Special Issue on Wearable Computing l*:218-224, 1997, retrieved Jun. 9, 2005, from http://www.bradleyrhodes.com/Papers/wear-ra-personaltech/, 10 pages.

Serena Software, Inc., "Serena™ Automating Change," retrieved Jun. 9, 2005, from http://www.serena.com, 1 page.

SETI Institute homepage, retrieved Jun. 9, 2005, from http://www.seti.org/site/pp.asp?c=ktJ2J9MMIsE&b=178025, 3 pages.

Siebel Systems, Inc., Siebel homepage, retrieved Jun. 8, 2005, from http://www.siebel.com/, 3 pages.

Singh, P., "Open Mind: common sense—Teaching computers the stuff we all know," retrieved Jun. 9, 2005, from http://commonsense.media.mit.edu/cgi-bin/search.cgi, 2 pages.

Singh, P., "The Open Mind Common Sense Project," Jan. 2, 2002, retrieved Jun. 9, 2005, from http://www.kurzweilai.net/articles/art0371.html, pp. 1-24, 24 pages.

Spice, B., "CMU Student Taps Brain's Game Skills," Oct. 5, 2003, retrieved Jun. 8, 2005, from http://www.post-gazette.com/pg/03278/228349.stm, 5 pages.

Spogg.com—homepage, retrieved Jun. 8, 2005, from http://www.spogg.com, 2 pages.

Sun Microsystems, Inc., "Products & Technologies—Java Technology," retrieved Jun. 9, 2005, from http://java.sun.com, 2 pages.

Sun Microsystems, Inc., "The Jini Technology Series: JavaSpaces Principles, Patterns, and Practice," retrieved Jun. 9, 2005, from http://java.sun.com/docs/books/jini/javaspaces/, 2 pages.

TopCoder, Inc., TOPCODER homepage, retrieved Jun. 8, 2005, from http://www.topcoder.com/, 2 pages.

University of California, "What is SETI@home?," retrieved Jun. 9, 2005, from http://setiathome.ssl.berkeley.edu./, 1 page.

Wilson, B. "Anti-Social Software," Apr. 30, 2004, retrieved Aug. 26, 2005, from http://www.brendonwilson.com/profile/000156.shtml, 5 pages.

Wolverton, T., et al., "Yahoo Launches Advice Site," Apr. 29, 2002, CNET News.com, retrieved. Apr. 29, 2004, from http://news.com.com/2102-1017_3-894968.html?tag+st.util.print, 2 pages.

* cited by examiner

|  | | 201 | 203 | 205 | 207 | Device Capabilities | | | |
|---|---|---|---|---|---|---|---|---|---|
|  | | | | | | 209a | 209b | 209c | 209d |
|  | | Task ID | Task Description | Qualifications | Location | Non-device capability task | Camera Needed | Software Platform | High Speed Data |
| 211a | | 336 | Get taxi ride | Chauffeur's License | 10025 | X | | | |
| 211b | | 337 | Take picture of Space Needle | | 98121 | | X | | |
| 211c | | 338 | Deliver Pizza | Driver's License | 98104 | X | | | |
| 211d | | 339 | Verify store ABC sells Product XYZ | | 60615 | X | | | |
| 211e | | 340 | Return videos to store DEF | | 08817 | X | | | |
| 211f | | 341 | Try new J2ME and give feedback | Game Tester | N/A | | | J2ME | X |
|  | | | ... | ... | | | | | |

| | Device ID 215 | Device Type ID 217 | Mobile Task Performer ID 219 | GPS 223 | Location 225 | Signal Strength 227 | High Speed Data Available 229 | Battery 231 | Mode 233 | Memory Available 235 |
|---|---|---|---|---|---|---|---|---|---|---|
| 237a | 987 | 377 | 123 | 41.801940, -87.599540 | 60615 | 5 | X | 3 | | 256 |
| 237b | 876 | 377 | 234 | 47.614809, -122.346073 | 98121 | 1 | X | 1 | Vibration | 1024 |
| 237c | 765 | 213 | 234 | | 90210 | 3 | | 2 | Vibration | 8192 |
| 237d | 654 | 424 | 456 | | | | | | | |
| 237e | 543 | 123 | 243 | 47.620000, -122.347123 | 98121 | 4 | X | 5 | | 32 |
| 237f | 432 | 234 | 333 | | | | | | | |
| 237g | 321 | 456 | 423 | | | | | | | |
| | ... | | | | | | | | | |

*FIG. 2C*

| | Mobile Task Performer ID 241 | Device ID 243 | Service Plan ID 245 | Preferred Device 247 |
|---|---|---|---|---|
| 249a | 123 | 987 | 219 | X |
| 249b | 234 | 876 | 233 | |
| 249c | 234 | 765 | 572 | X |
| 249d | 456 | 654 | 219 | |
| | ... | | | |

| 251 | 253 | 255 | 257 | 259 | 261 | 263 | 265 | 267 | |
|---|---|---|---|---|---|---|---|---|---|
| Device Type ID | Device Description | Camera | SMS | EMS | Display Size | J2ME | Brew | Network Used On | ... |
| 377 | Motorola RAZR V3c | Y | Y | Y | 2.2 in | N | Y | CDMA | |
| 123 | Nokia 6010 | | | | | | | | |
| 234 | Motorola i760 | N | | | | Y | | iDEN | |
| 456 | Ericsson t60d | N | | | | N | | TDMA | |
| 424 | Blackberry 7730 | N | | | | Y | | GPRS | |
| 213 | ZyXel 2000W | N | N | N | | N | N | Wifi | |
| ... | | | | | | | | | |

| 273 | 275 | 277 | 279 | 281 | 283 | 285 | 287 | 289 | 291 | 293 |
|---|---|---|---|---|---|---|---|---|---|---|
| Service Plan ID | Peak Minutes | Nights Start | Nights End | Night Minutes | Included SMS Message | Max Data | GPS Included | Included MMS Messages | Walkie Talkie Minutes | Incoming Minutes Free |
| 219 | 500 | 9 pm | 6 am | Unlimited | Y | - | N | Y | - | N |
| 233 | 300 | 8 pm | 7 am | 1000 | Y | 2 MB | N | Y | - | N |
| 572 | 250 | 7 pm | 7 am | 1500 | N | - | Y | N | 500 | Y |
| ... | | | | | | | | | | |

FACILITATING PERFORMANCE OF SUBMITTED TASKS BY MOBILE TASK PERFORMERS

TECHNICAL FIELD

The following disclosure relates generally to techniques for facilitating performance of tasks by task performer users, such as by identifying appropriate task performer users for a task based on current locations of those users and/or based on characteristics of mobile devices associated with those users.

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

In addition to such Web-based interactions between computers (e.g., interactions initiated by users using Web browser applications to interactively request Web pages from Web servers), various distributed computing systems are known in which multiple computer systems interact in other manners in order to achieve a goal. For example, it is often desirable for an application program on a computer system to interact with remote systems and applications in order to obtain various types of information and functionality that are not part of the application program. By performing such interactions, an application program may be able to leverage information and functionality from vast numbers of other computer systems over the Internet or other networks. In order to enable such interactions between remote computer systems and application programs, various programmatic interaction mechanisms have been developed. For example, remote procedure call ("RPC") protocols have long existed that allow a program on one computer to cause a program on another computer to be executed, and various object-oriented and other architectures such as CORBA ("Common Object Request Broker Architecture"), Java RMI ("Remote Method Invocation"), JavaSpaces, Jini, JXTA, UPnP ("Universal Plug and Play") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the Web has also provided additional opportunities for computers to inter-communicate in various programmatic manners. For example, there is growing use of the Web to provide so-called "Web services," which typically involve the programmatic interaction of remote applications to exchange information via defined APIs ("application program interfaces"), or the like. Web services may allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Unfortunately, while Web services and other programmatic interaction mechanisms allow various application programs and computers to interact, such interactions are typically limited in various ways. For example, the types of information and functionality that are available to be requested using such programmatic interactions are typically restricted to very limited types of requests that the remote computer systems and applications can automatically fulfill (e.g., to provide a specified predefined group of information, such as a Web page or file, or to perform a specified database query on a specified database). Moreover, there is a very large class of tasks which computers and application programs cannot easily automatically perform, but which humans can typically easily perform, referred to herein as "human performance tasks." This is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

However, various problems exist with using such humans to perform such tasks. For example, it may be difficult to identify humans that are willing to perform any tasks, and such humans may not be aware that tasks are available to be performed or of how to obtain information about such tasks. In addition, other types of tasks that humans may be particularly suited to perform include tasks that are associated with particular physical locations, such as related to activities to be performed at those locations. Unfortunately, such problems may be exacerbated for at least some location-based tasks, particularly if the tasks are to be performed during a limited period of time (e.g., based on current conditions at a location). In addition, in some cases performance of a task and/or performing communications about a task may require or be enhanced if a user has one or more devices with particular capabilities or characteristics, but it is difficult to identify users with such devices.

Thus, it would be beneficial to provide techniques for efficiently and quickly identifying appropriate users to perform tasks, such as based on current locations of those users and/or based on characteristics of mobile devices associated with those users, as well as to provide other benefits.

BRIEF DESCRIPTION OF THE DRAWINGS

FIGS. 2A-2E provide examples of using a variety of types of information to facilitate performance of tasks.

DETAILED DESCRIPTION

Figure 1A:
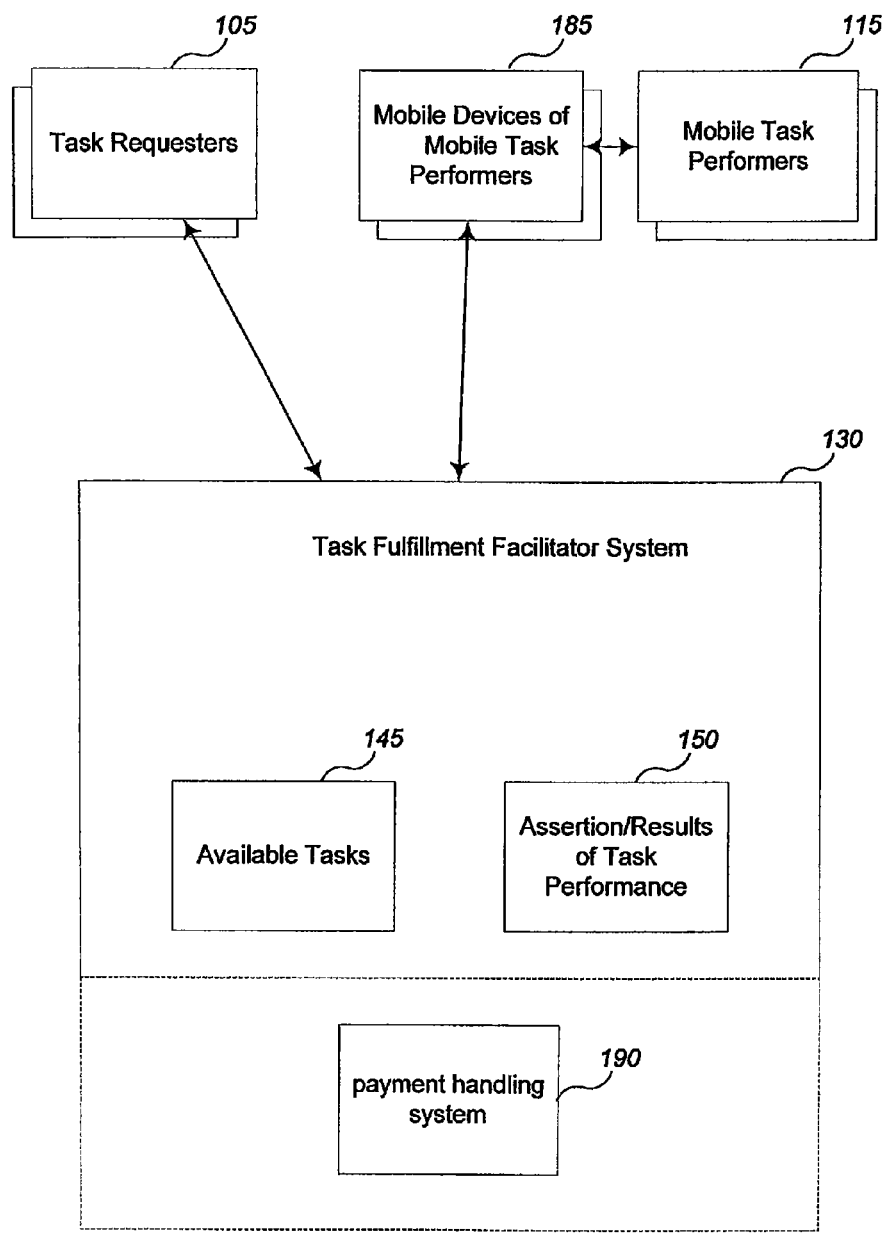
FIG. 1A is a network diagram illustrating examples of interactions to facilitate performance of tasks.

Techniques are described for facilitating performance of tasks by human users. In at least some embodiments, a task exchange server system acts an intermediary to facilitate performance by human task performer users of tasks provided by other task requesters, such as by providing information about tasks to task performer users via a Web site or other electronically accessible site on the Internet or other communications network. In addition, in some embodiments, the performance of tasks may be facilitated by the task exchange server by distributing information about available tasks in other ways, including by providing information about tasks to at least some task performer users via mobile devices of those users, such as to mobile task performer users who move among multiple geographic locations and are available to perform tasks while at and/or between such locations. By providing task information to such mobile devices, the mobile task performer users may, for example, obtain information about available tasks without directly interacting with the task exchange server, as well as obtain information about tasks that are appropriate for the current locations and other contexts of the mobile task performer users. In this manner, information about tasks may be provided to users by the task exchange server in an efficient manner with minimal action on the part of the users, and information about particular tasks of interest (e.g., tasks to be performed in a short time) may be quickly provided to users who may have interest in and are appropriate for performing those tasks.

In addition, in at least some embodiments, such mobile task performer users may be able to elect to perform some or all such tasks about which they receive task information, such as by using capabilities of one or more mobile devices. For example, a mobile task performer user may use a digital camera capability of a mobile device (e.g., a digital camera device, a cellphone with integrated camera, etc.) to take one or more pictures of a particular geographical location, or may use a microphone or other sound-capturing input sensor of a mobile device to record sounds at a particular time and/or location. As another example, a mobile task performer user may perform a task that involves transporting a load (e.g., one or more people and/or products or other objects) to and/or or from a particular geographic location, with information about the task received via one or more mobile devices of the user. The mobile task performer users may further interact with the task exchange server to provide the results of such task performance (e.g., a digital picture that was taken, a digital signature indicating acceptance of a delivered object to a particular recipient, etc.) in various ways, such as via one or more mobile devices of the users (whether the same or different devices via which the users receive the task information), or instead via a Web site or other interaction mechanism of the task exchange server.

In at least some embodiments, some or all of the tasks whose information is distributed to mobile task performer users may each be associated with one or more geographical locations and/or one or more other criteria regarding performance of the task, such as device-related criteria that correspond to one or more mobile devices of users who perform the task. If so, one or more appropriate task performer users may be automatically determined for each such task in such a manner as to reflect the location-based and/or device-based criteria for the task, such as based on the location and/or mobile device(s) associated with those task performer users. After identifying one or more appropriate task performer users for a task, at least one of such users may be notified about the task in various ways, including by providing information about the task to one or more mobile devices of each such task performer user (whether the same mobile device to which one or more device-based criteria for the task were matched, or instead another mobile device).

Information about locations and/or mobile devices of task performer users may be obtained by the task exchange server in various ways. For example, in some embodiments, at least some mobile devices may be able to automatically determine a current location of the device (and any user carrying or otherwise transporting the device), such as via GPS ("Global Positioning System") capabilities of the device. In addition, at least some such devices may be able to identify capabilities of the device (e.g., types of functionality that the device is designed and/or configured to perform) and/or other current characteristics of the devices (e.g., current storage available, memory available, battery power levels, transmission signal strength, etc.). At least some such devices may further be configured to automatically report such location-based and/or device-based information to the task exchange server under specified circumstances (e.g., by periodically transmitting the information; by including the information when the device performs another communication to the task exchange server, such as sending a request for information that is initiated by a user of the device; etc.). The reporting of information by a device may be performed by, for example, using wireless cellphone or data transmission capabilities of the device, or instead by using similar capabilities of another related mobile or other device (e.g., a nearby device belonging to the same user with which the first device may communicate, such as by using Bluetooth transmissions, infrared-based transmissions, wired-based or cabled-based communications, etc.). In other embodiments, a task performer user may manually indicate some or all such location-based and/or device-based information to the task exchange server, such as when requesting tasks appropriate for his/her current location and/or for current characteristics of his/her mobile device(s). Furthermore, in some situations the task exchange server may initiate contact to a mobile device and/or a task performer user in some situations to obtain such information about current location and/or device characteristics, such as by using previously supplied contact information for the device and/or user (e.g., during initial registration of the user with the task exchange server), and/or by interacting with a client-side application executing on a mobile device that facilitates such communications.

Thus, in some embodiments, one or more computing systems provide a task exchange server that acts as an intermediary to allow task requesters to submit tasks that each prefer or require a physical presence of a task performer user at one or more indicated geographical locations in order to perform the tasks, and/or that each prefer or require that a task performer user who performs the task have one or more devices with indicated capabilities to communicate about the task and/or to perform at least portions of the task. The task exchange server may further facilitate that a task requester receive corresponding results after a task is performed (e.g., information generated by performance of the task, an assertion that the task was performed, etc.). Similarly, task performer users may access the task exchange server in order to obtain information about available tasks that they can perform, provide various types of information to the task exchange server (e.g., information about mobile devices used by the task performers, task information receipt preferences and/or other preferences, etc.), and provide the results of task performance after the completion of tasks that they are assigned. In at least some embodiments, some or all of the task requesters and/or task performers are mobile and interact with the task exchange server using one or more mobile devices, such as for task performers to receive task information and provide results of task performance, and such as for task requesters to submit task information and/or receive results of task performance. By enabling large numbers of unaffiliated or otherwise unrelated task requesters and task performers to interact via the intermediary task exchange server in this manner, free-market mechanisms can be used to efficiently perform tasks with location-based and/or device-based criteria regarding task performance. Additional details related to examples of interactions of mobile users with a rapid answer system that may act as a task exchange server for certain types of tasks are included in pending commonly-owned U.S. patent application Ser. No. 11/396,286, filed Mar. 31, 2006 and entitled "Facilitating Content Generation Via Messaging System Interactions"; which is hereby incorporated by reference.

FIG. 1A illustrates examples of interactions to facilitate performance of tasks. In this example, a Task Fulfillment Facilitator ("TFF") task exchange server system 130 is operating to facilitate interactions with mobile task performers, such as to perform tasks that have associated locations and/or device-related characteristics. The TFF system may be implemented in various ways in various embodiments, such as a software system executing on one or more computing systems or devices (e.g., in a distributed manner, such as on a peer-to-peer or grid network).

In this example, a variety of task requesters 105 (e.g., human task requester users) are interacting with the TFF system to submit tasks to be performed, as well as to perform various other interactions. As discussed in greater detail elsewhere, each of the task submissions may include a variety of information about the task to be performed, including one or more qualifications of any task performer who performs the task, one or more geographical locations associated with the task, one or more capabilities and/or other current characteristics of one or more devices to be used as part of performing the task, one or more capabilities and/or other current characteristics of one or more devices to be used in exchanging one or more electronic communications related to the task, one or more other criteria related to task performance (e.g., deadlines for completion, format of results from task performance, etc.), and one or more associated rewards (e.g., monetary payments) to be provided to one or more task performers who successfully perform the task.

FIG. 1A also illustrates various task performers 115 (e.g., task performer users) who interact with the TFF system to perform available tasks. In this example, the illustrated task performer users are each mobile task performer users, although in other embodiments other non-mobile task performer users (not shown) may also interact with the TFF system. The mobile task performer users each interact with the TFF system in this example via one or more mobile devices 185, such as to identify appropriate tasks that are currently available in the vicinity (e.g., within a predetermined distance) of the mobile task performer's current geographical location and for which the mobile task performer is qualified and for which any device-related criteria are satisfied by the capabilities and other characteristics of the mobile devices. Mobile task performers 115 may also interact with the TFF system in some embodiments using other computing devices or systems (not shown), such as to use a desktop or other fixed-location computer to receive information about tasks and to then travel to an indicated location to perform the task. While not illustrated, some users may also serve as both task requesters and task performers, such as for different tasks.

In this example, the TFF system tracks information about the status of tasks, such as by updating information about available tasks 145, and stores results 150 from the performance of tasks. After a task is performed and corresponding results are received, the TFF system may notify the task requester that supplied that task of the results in a variety of ways. For example, in some embodiments the results are provided to task requesters via an interactive console when the task requesters next interact with the TFF system. Alternatively, task performance results may instead be electronically sent to the task requesters, such as a response to a prior request that submitted the task, or may instead be sent to task requesters in various other ways (e.g., via telephone, fax, postal mail, etc.). Similarly, after performance results are received for a task, the TFF system may notify the task requester that supplied the task to perform one or more of various actions (e.g., to indicate if the task was performed satisfactorily). Notifications of task performance results may not be sent to the task requester in some circumstances, such as for those types of tasks in which the task requester already knows that the task was performed (e.g., tasks taking place in the task requester's presence, or that require a physical delivery to the task requester).

In addition, the TFF system in the illustrated embodiment facilitates the exchange of payments or other rewards between parties to transactions involving tasks, such as between task requesters and mobile task performers (e.g., to provide payments to the mobile task performers from the task requesters for satisfactory performance of submitted tasks). In the illustrated embodiment, the TFF system may include internal payment handling capabilities, such as via a payment handling system 190, although in other embodiments the TFF system may instead interact with an external payment handling system (whether from the same organization that provides the TFF system or instead from a third party), not shown, to provide the payments. In some situations, task performance payments may be made automatically after a task is performed (e.g., after receiving an assertion from the mobile task performer that the task has been completed), while in other situations the payments may instead be made only after the task requester has reviewed and accepted the results (or failed to reject the results after a specified period of time) or after automatic verification of the results. In addition, as described in greater detail elsewhere, a variety of other types of payments may be made in other situations, such as payments from mobile task performers, payments to or from the TFF system (e.g., for services provided by the system), and/or payments to or from one or more third parties (e.g., to establish or verify qualifications). Moreover, a variety of types of non-monetary compensation (e.g., for performance of tasks) and other non-monetary rewards may also be used in other embodiments, whether provided by task requesters (e.g., for performance of submitted tasks), mobile task performers (e.g., for the opportunity to perform tasks), the TFF system (e.g., for specified types of user activities), and/or third parties to transactions related to task performance.

Figure 1B:
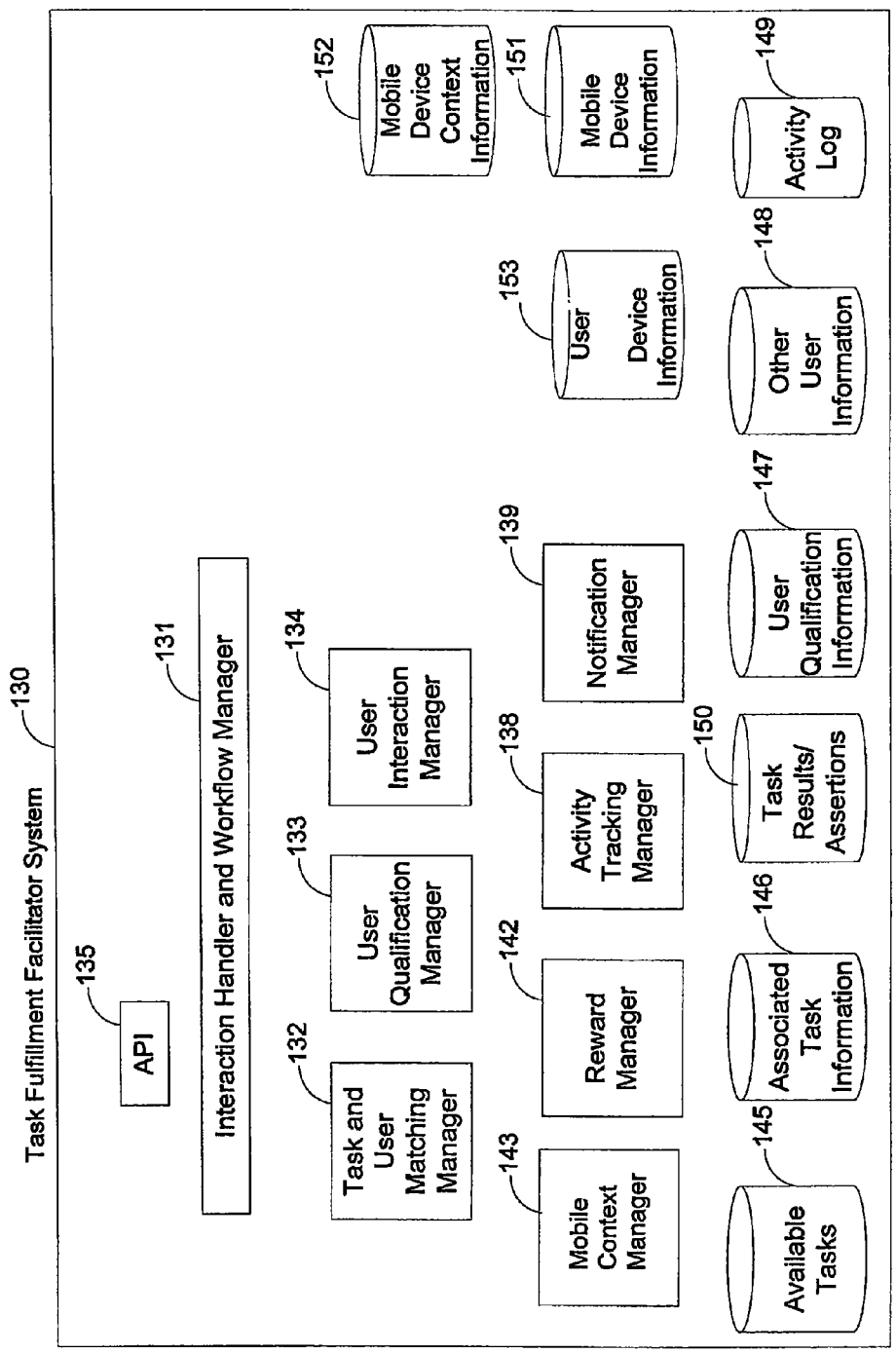
FIG. 1B is a block diagram illustrating an example embodiment of a system for facilitating performance of tasks.

FIG. 1B illustrates examples of various types of modules and corresponding functionality for one example embodiment of the TFF system 130. In particular, the illustrated embodiment of the TFF system includes a module 131 that receives requests and information from users (e.g., via an API 135 of the TFF system), and handles the requests and information as appropriate (e.g., by implementing business logic and/or workflow processing for a specific embodiment, or by providing or otherwise producing requested information, such as to produce information related to tasks to be performed and/or related to results of task performance, calling the appropriate internal module). For example, as tasks are submitted by task requesters (e.g., via the API or mobile devices), the module 131 stores information about the available tasks and any associated performance criteria in a database 145, and further stores any additional associated information for the tasks (e.g., information to be analyzed or manipulated as part of a task) in a database 146. Information about available tasks may then be provided to users by the module 131 (e.g., via the API), such as by automatically notifying mobile task performers about appropriate tasks (e.g., by sending communications to mobile devices of the users), or in response to requests from mobile task performers, other modules, and/or task requesters that are received (e.g., requests to access information about a specified task, or to search or browse for various tasks). In addition, when mobile task performers provide results from performance of tasks, the module 131 stores the task results information in a database 150, and may further provide information about the results to users (e.g., the task requesters that submitted the tasks) as appropriate (e.g., via the API).

The module 131 may also provide a variety of types of functionality other than exchanging task and task result information with users. For example, the module 131 may receive various types of information about users (e.g., evidence of a user's identity, information about a user's mobile device(s), qualification information for users, payment source and/or repository information for a user, demographic information, user preferences, etc.), such as when users initially register with the TFF system to act as mobile task performers and/or task requesters. In the illustrated embodiment, the module 131 then stores the user qualification information in a database 147, user's mobile and other device information in a database 153, and the other user information in a database 148 (although in other embodiments the information may be stored in other ways), and may then provide such information to users or other modules when appropriate. In the illustrated embodiment, the device information database 153 stores information to track which devices are associated with each user, and may further store contact information (e.g., IP address, telephone number, etc.) for each such device. Information about inherent capabilities of each model or other type of device used with the system are stored in a separate database 151, while additional information about current characteristics of each device (e.g., current location, battery power, available memory, current communication service plans and their associated parameters, etc.) are stored in a context database 152. Information about the devices may be stored in other manners in other embodiments, such as by storing all information about devices together in a single database. A variety of other types of information may also be available (e.g., information about users' accounts with the TFF system, aggregate information about groups of related users or all users, information about historical activities of specific users and/or groups of users, summary and overview information about tasks that have been performed, etc.), and if so the module 131 may similarly provide such information to users or other modules when appropriate.

In the illustrated embodiment, the TFF system further includes various additional modules that provide additional types of functionality, such as to assist the module 131, although in other embodiments some or all of the additional modules and/or additional types of functionality may not be included, or may be combined together in different manners. As one example, some embodiments of the TFF system include an Access Control Manager module (not shown) to assist in controlling access to various functionality and stored information, such as based on specific access policies specified by users for specific pieces of information and/or based on default policies of the TFF system.

The illustrated embodiment of the TFF system includes a User Interaction Manager module 134 to assist in managing at least some types of interactions with users. For example, in some embodiments task requesters and/or mobile task performers may be allowed to register and specify preferences and/or requirements for how certain types of task-related interactions are to occur (e.g., so as not to exceed a specified percent or total quantity of included communication units in a service plan) and/or how results from a mobile task performer are to be obtained. In embodiments in which the TFF system includes one or more consoles (not illustrated here) with which users interact, the User Interaction Manager module may further be included with or otherwise affiliated with one or more of the consoles to facilitate those user interactions with the consoles. In addition, while in the illustrated embodiment the User Interaction Manager module operates in conjunction with the module 131 to control particular types of interactions in a user-configurable manner, in other embodiments the module 131 may instead directly include some or all of the types of functionality provided by the User Interaction Manager module.

The illustrated embodiment of the TFF system further includes a User Qualification Manager module 133 to assist in specifying qualifications of users, such as qualifications of mobile task performer users related to performing tasks and/or qualifications of task requester users related to submitting available tasks. In particular, in the illustrated embodiment the User Qualification Manager module allows users to specify new qualification types, as well as to issue or assert specific qualifications of users of those qualification types (or of predefined qualification types in embodiments in which the TFF system provides them). Information about user-specified qualification types and specified user qualifications is then stored in the illustrated embodiment in database 147, and may be used by task requesters, other modules, and/or mobile task performers who have access to that information (e.g., to search for users having specified qualifications, to identify preferred or required qualifications for mobile task performers who perform tasks, to identify preferred or required qualifications for task requesters who have submitted tasks, etc.).

As discussed in greater detail elsewhere, in some embodiments the TFF system may further assist in specifying user qualifications based on numerical assessments of prior task-related activities by tracking information about the occurrences of such activities.

A Task and User Matching Manager module 132 is also illustrated in the example embodiment of the TFF system to assist in matching available tasks to be performed and appropriate available mobile task performers to perform the tasks. The matching of tasks and mobile task performers may be performed at various times and in various ways. For example, in some embodiments the matching may be performed in response to requests from mobile task performer users for tasks that meet specified criteria, with the matching tasks provided to the mobile task performer users as candidates that they can select to perform. Alternatively, in some embodiments the matching may be automatically performed for at least some types of tasks when the tasks are submitted (e.g., tasks to be performed in a substantially real-time manner or before an indicated deadline), such as to assist in quickly identifying one or more mobile task performers to perform the tasks. In addition, in some embodiments the matching may be performed by matching information about the tasks and the mobile task performers (including information about any mobile devices associated with the mobile task performers), such as by identifying mobile task performers in a particular geographical location or having one or more mobile devices with specified characteristics. In other embodiments, the Matching Manager module may use additional information (e.g., qualifications, preferences of mobile task performers and/or task requesters, preferred but not required criteria specified for tasks, etc.) when performing matching, and/or perform various additional activities related to matching. Other information regarding matching of tasks and mobile task performers is discussed in greater detail elsewhere.

The illustrated embodiment of the TFF system further includes several other modules that provide additional types of functionality to assist operation of the system. For example, the illustrated embodiment includes an Activity Tracking Manager module 138 that tracks a variety of types of activities (e.g., locations of and/or availability of communications with each mobile task performer at various times during the day, each activity taken by a user with respect to a submitted task, etc.) and stores the tracked information in an activity log database 149. The Activity Tracking Manager module or other part of the system can then analyze the logged information to determine various types of aggregate or summary information (e.g., for use in matching tasks to mobile task performers by determining patterns for activities and/or availability of at least some of the mobile task performers).

The illustrated embodiment also includes a Notification Manager module 139 that provides notifications to users as appropriate, such as to notify mobile task performers when tasks become available (e.g., a new task has been submitted, an existing task is now available to a task performer based on a new location and/or other changes in device characteristics for the task performer, etc.), to notify task requesters when results of performance of their previously submitted tasks are available, etc. The notifications may be performed in various ways in various embodiments, such as via one or more electronic messages of one or more types (e.g., automated telephone calls, emails, instant messaging, text messaging, SMS (or "Short Message Service") messages, MMS (or "Multimedia Message Service") messages, RSS (or "Really Simple Syndication") feed communications, etc.). The illustrated embodiment also includes a Reward Manager module 142 that tracks information about compensation and other rewards for users based on their activities, such as to maintain a financial repository for each user for use in providing or receiving compensation (e.g., money, points, gift certificates, etc.). In addition, the Rewards Manager module and/or other accounting manager module (not shown) may perform various administrative functions related to rewards, such as obtaining financial payments or other reward information from users.

The illustrated embodiment also includes a Mobile Context Manager module 143 that manages information about current characteristics of devices, such as for mobile devices. Such current device characteristics information may be obtained in various ways, as discussed in greater detail elsewhere, and in the illustrated embodiment is stored in database 152 for use by other modules (e.g., the Matching Manager module 132 for use in determining tasks that are appropriate for mobile task performers based on characteristics of their mobile devices).

Additional details related to an example task fulfillment facilitator system that may act as a task exchange server to facilitate transactions between task requesters having tasks available to be performed and task performers able to perform tasks, such as by providing an electronic marketplace for such transactions, is included in pending commonly-owned U.S. patent application Ser. No. 10/990,949, filed Nov. 16, 2004 and entitled "Providing An Electronic Marketplace To Facilitate Human Performance Of Programmatically Submitted Tasks," which is incorporated by reference. Additional details related to identifying tasks for task performer users are included in commonly-owned U.S. patent application Ser. No. 11/537,508, filed concurrently and entitled "Identifying Tasks For Task Performers Based On Task Subscriptions," and in commonly-owned U.S. patent application Ser. No. 11/537,502, filed concurrently and entitled "Automatically Generating Task Recommendations For Human Task Performers," each of which is hereby incorporated by reference in its entirety. Additional details related to providing information to a task performer user about available tasks are included in commonly-owned U.S. patent application Ser. No. 11/537,491, filed concurrently and entitled "Facilitating Performance Of Tasks Via Distribution Using Third-Party Sites," which is hereby incorporated by reference in its entirety.

For illustrative purposes, some embodiments are described below in which specific types of interactions occur between specific examples of a task exchange server, mobile task performer users, and mobile devices in order to facilitate performance of specific types of tasks. However, those skilled in the art will appreciate that the described techniques may be used in a wide variety of other situations, including with other types of tasks, and in situations other than with a task exchange server, and that the invention is not limited to the exemplary details provided.

FIGS. 2A-2E provide examples of using a variety of types of information to facilitate performance of tasks, such as by automatically associating tasks with appropriate mobile task performers who may perform the tasks. In particular, FIG. 2A first illustrates an exemplary series of tasks submitted to the TFF system by task requesters, and FIGS. 2B-2E describe examples of current characteristics of various mobile devices associated with mobile task performers.

With respect to FIG. 2A, a series of six example tasks 211*a*-211*f* are shown in a table. The table containing the tasks may, for example, be part of the Available Tasks database 145 of FIGS. 1A and 1B. In this example, the table has various columns including a task identifier 201, a description of the task 203, associated qualifications 205, an associated geographical location 207 (in this example represented as a zip code), and various capabilities 209 of one or more mobile or other devices for use in performing the task. In some embodiments, locations may be specified in other manners (e.g., GPS coordinates; street addresses; governmental boundaries, such as for cities, counties, regions and states; telephone area codes; etc.), some tasks may have multiple associated geographic locations, and tasks other task 211f may not have any associated geographic location. The illustrated capabilities in this example include an indication 209a that no device capabilities are specified, digital (or other) camera capabilities 209b, J2ME ("Java 2 Platform, Micro Edition") software execution capabilities 209c, and a high speed data transmission connection ability 209d. In other embodiments, a lack of specified device capabilities may be indicated in other manners (e.g., an absence of other selected capabilities), and illustrated types of capabilities may be represented in other manners (e.g., to include minimum and/or maximum values for camera pixels or resolution, for data transmission connection bandwidth, etc.). In addition, a variety of additional device capabilities may be specified, including other software execution environments, data format display or processing capabilities, video recording capabilities, audio recording capabilities, display size, other presentation capabilities, etc. Various device capabilities may reflect types of functionality for which the devices are designed and/or configured, and other types of device capabilities are described elsewhere. A variety of additional types of information about tasks may also be stored and used in some embodiments, such as an identifier for the task requester that submitted the task, a short and long description of the task, a deadline for performing the task, an indication of a reward for satisfactorily completing the task, etc.

FIG. 2B next describes the current context of various mobile and other devices associated with mobile and other task performers, such as to reflect current characteristics of those devices other than capabilities. The illustrated table for FIG. 2B may, for example, be part of the Mobile Device Context Information database 152 of FIG. 1B. In this example, each row of the table reflects a specific mobile device instance (or copy) that is in use by an associated mobile task performer, and the table contains columns relating to a device instance identifier 215, a device type identifier 217, an associated mobile task performer identifier 219, GPS coordinates 223 for the location of the device, a zip code of the current location 225, data transmission connection signal strength 227, other current high speed data availability 229 (e.g., based on a wired or cabled connection), a battery power level 231 (e.g., which may be of use, for example, in determining if the device has enough power to complete a particular task), an indication 223 of the status of one or more particular device modes (e.g., vibration mode), and memory availability 235 (e.g., which may be of use, for example, in determining if a device can store sufficient information to perform a task). Information such as a current zip code may be determined in various ways, such as automatically based on GPS coordinates or other automatically obtained location information (e.g., cellular network tower location, Wi-Fi access point location, using geo-location based on IP address in use, etc.), or instead manually (e.g., by the task performer using the device to provide the location information). In other embodiments, illustrated types of current device characteristics may be represented in other manners, and a variety of additional device characteristics may be specified (e.g., whether a particular device is currently on), as discussed in greater detail elsewhere. Various device characteristics may frequently change, including when an associated task performer moves the device from one geographical location to another (e.g., from one street address to another, from one neighborhood or city to another, from one building or room within a building to another, etc.), and information about current characteristics may be obtained in various ways, as discussed elsewhere.

FIG. 2C provides example information that correlates mobile task performers to mobile device instances, as well as to associated service plans for the devices in this example. The table may, for example, be part of the Mobile Device Information database 151 of FIG. 1B. In this example, the table has columns containing a mobile task performer identifier 241, a device instance identifier 243 (corresponding to the device instance identifiers in column 215 of FIG. 2B), a service plan identifier 245, and an indication 247 of whether the device is a preferred device for the task performer. Since mobile task performers may often have more than one device, this example embodiment allows a mobile task performer to designate a preferred mobile device (e.g., for contact or other communication purposes), although in other embodiments preferred devices may not be designated or a single device associated with a particular task performer user may be automatically designated as preferred.

FIG. 2D illustrates example capabilities of various example types of mobile devices used by mobile task performers. The illustrated table may, for example, be part of the Mobile Device Information database 151 of FIG. 1B. In this example, the table includes columns for a device type identifier 251 (corresponding to the device type identifiers shown in column 217 of FIG. 2B), a device description 253, camera capabilities 255, SMS messaging capabilities 257, EMS ("Enhanced Message Service") messaging capabilities 259, a display size 261, J2ME execution capabilities 263, BREW execution capabilities 265, and a type 267 of communication or transmission network that the device uses. In other embodiments, illustrated types of capabilities may be represented in other manners, and a variety of additional types of device capabilities may be specified, as discussed in greater detail elsewhere.

FIG. 2E illustrates example details about types of service plans associated with mobile device instances, with each of the illustrated service plan types being available for use by more than one mobile task performer. In some embodiments, the task exchange server may receive information about service plans associated with one or more mobile devices of mobile task performers. The service plan information may then be utilized in various manners (e.g., to decide the most cost-effective manner to send notifications to the mobile task performer; to set limits on communications to the mobile task performer, such as to avoid overage charges and/or peak usage fees; to queue non-time sensitive notifications until off-peak times; etc.), including in matching tasks to mobile task performers. For example, if an allocated number of MMS ("Multimedia Messaging Service") messages have been used for the month, then the mobile task performer may not want to receive any additional MMS messages about tasks, or not about relatively low-paying tasks and/or tasks with large amounts of associated data. In other embodiments, information about service plans may not be used.

The illustrated table of FIG. 2E may, for example, be stored in the User's Mobile Device Information database 153 of FIG. 1B. In this example, the illustrated table includes various columns, including a service plan identifier 273, an indication of peak minutes 275, an indication of a time that starts night (or non-peak time) rates 277, an indication of the end of nights 279, an indication of a number of night minutes 281, an indication of whether SMS messages are included 283, an indication of maximum data per time period 285, an indication of whether GPS functionality is available in the plan 287, an indication of whether MMS messages are included 289, an indication of included walkie-talkie minutes 291, and an indication of whether incoming minutes are free 293. These details about a service plan are exemplary, and other additional details may be used in other embodiments, such as the dates of the monthly cycle, when weekends start, provider's name, whether in-network calling is free, rollover rules, etc.

While not illustrated here, various additional information specific to mobile task performers may similarly be stored and used, such as to reflect preferences of mobile task performers (e.g., related to willingness to use particular mobile devices for particular types of tasks or other purposes), current location of the mobile task performers (which may be different than that of one or more of the mobile devices of a task performer, such as if the task performer is not currently carrying a mobile device), current willingness of the mobile task performer user to receive information about tasks and/or perform tasks, other current characteristics of mobile task performers, etc. Such information may be obtained in various ways, including based on information explicitly supplied by the mobile task performers (e.g., so that a particular mobile task performer can indicate when to turn on or turn off whether information about tasks will currently be supplied to one or more mobile devices of the mobile task performer) and/or supplied by devices used by the mobile task performers (whether specifically indicated by the task performers or inferred by the devices).

The various information about particular mobile devices and mobile task performer users may then be utilized in various manners by the task exchange server in matching tasks and task performers that are appropriate for each other (e.g., to determine whether the capabilities of a device type are suitable for a task, to determine whether the current characteristics of particular device instances of a device type are suitable for a task, to decide whether and how to send particular types of content to a particular mobile device, etc.). For example, if a task involves the use of a camera and a particular geographic location (e.g., to take a particular of a particular object at a particular location at a particular time), then the task may be matched with mobile task performers that have a mobile device with camera capabilities at or near the location. Thus, in this example, the picture-taking task illustrated in row 211*b* of FIG. 2A would be matched to a mobile task performer that has an appropriate mobile device and mobile location. In this example, the only type of mobile device listed in FIG. 2D that includes camera capabilities is the Motorola RAZR V3c (as illustrated in row 269*a* of the table of FIG. 2D). As shown in rows 249*a* and 249*b* of the table in FIG. 2C, only mobile task performers 123 and 234 currently have a device instance of that type, and only mobile task performer 234 has a device at a location near or at the location for the task (as shown in rows 237*b* and 237*a* of FIG. 2B). Thus, this task in this example may be matched to the mobile task performer 234. Similarly, in this illustration, the task represented in row 211*f* would be matched to a mobile task performer having either a Blackberry 7730 or a Motorola i760 type of device, since those devices have J2ME capabilities (as indicated in rows 269*c* and 269*e* of the table illustrated in FIG. 2D).

Although not shown, information about other devices associated with a mobile task performer may additionally be received and stored. For example, the task exchange server may store information about a vehicle associated with a mobile task performer (e.g., for use regarding tasks in which a vehicle is desirable or needed, such as the ones illustrated in rows 211*a* and 211*c* of the table illustrated in FIG. 2A; for use in situations in which the vehicle includes computing or other capabilities that allow it to act as one or more mobile devices; etc.). In addition, information about devices other than mobile devices may similarly be stored and used in at least some embodiments.

The information in FIGS. 2A-2E may be organized in various manners in other embodiments. For example, although the information in FIGS. 2A-2E are illustrated as being in tables, the information may be stored in other suitable manners such as in a XML database, an object oriented database, or a comma-separated file. In addition, the tables may contain more information or less information, and may be combined into more tables or less tables.

As previously mentioned, the task exchange server may provide in some embodiments functionality to automatically match mobile task performers and new tasks as they become available, potentially for a fee (e.g., a fixed amount, or a percentage of any payment provided to the mobile task performer if they complete a task for which they are notified). For example, if a mobile task performer has previously supplied contact information, location information, mobile device characteristics and/or preference information regarding tasks of interest (e.g., tasks in specified categories, having specified key words, from specified task requesters, from requesters having specified qualifications, etc.), such as during an initial registration process or via a program running on the mobile device, the task exchange server can perform automated matching for new tasks that are submitted in order to determine whether the mobile task performer satisfies the specified criteria for the task and would desire to be notified of the task. If so, the task exchange server can notify the mobile task performer in a variety of ways, such as based on previously provided preference information regarding how and when they are to be notified, based on the most cost effective manner to the mobile task performer's mobile device. In addition, in some embodiments the automated matching may further automatically assign new tasks to appropriate task performers (e.g., in accordance with preference information specified by the performers), including locking the task assignments if appropriate for the task. In some embodiments, the automated matching may also be performed in response to a request from a mobile task performer (e.g., via the mobile task performer's mobile device).

Matching of tasks and mobile task performers may be provided in a variety of ways. For example, in some embodiments, matching will be performed in a bi-directional manner, such as based on geographical location and/or when tasks have criteria including for mobile task performers and mobile task performers have conditions for tasks (e.g., attributes of the task and/or of the task requester that submitted the task). Thus, for example, the task illustrated in row 211*a* of the table illustrated in FIG. 2A may be matched by first looking for mobile task performers located in or near zip code 10025 and then subsequently determining whether any of the identified mobile task performers have the indicated qualifications for the task. Conversely, when a mobile task performer in the 10025 zip code requests tasks, the mobile task performer may be matched to the task illustrated in row 211*a*. In addition, a variety of other types of information may similarly be considered when performing matching. For example, in some embodiments a match may be time-sensitive (e.g., based on an urgency of a task), qualification-sensitive (e.g., when the qualifications for a task result in few mobile task performers in the geographical area able to perform the task) and/or price-sensitive (e.g., when the price for performing the task varies over time, such as to increase the price over time until a task is performed or to instead decrease the price over time). Similarly, in some embodiments a variety of other types of information may be considered, such as legal constraints (e.g., to enforce a minimum or maximum limit on the number of tasks assigned to a mobile task performer, such as for contractual or tax reasons, or to restrict performance of tasks in some embodiments and situations to certain mobile task performers). In addition, some types of tasks may be restricted to certain types of mobile task performers, such as only new mobile task performers (e.g., to assist new mobile task performers who may lack extensive qualifications) and/or only experienced mobile task performers.

As previously noted, a variety of types of tasks can be submitted and performed in various embodiments, and may include tasks that involve a variety of types of activities by mobile task performers, such as performing last mile delivery (e.g., to deliver a pizza or dry cleaning to a task requester), transporting the task requester to another location, making an audio and/or visual recording e.g., take a photograph), trying out a specified route to get from one specified place to another (e.g., by driving the route or taking public transportation), on-site outsourced tasks (e.g., customer service, computer help, etc.) or providing information about current conditions at a geographical location (e.g., traffic on a specified roadway, weather conditions, estimate of crowd numbers, download times for various digital information, signal strength at the specified location, etc.). In some embodiments the tasks may each require little time of the mobile task performer (e.g., at most a few minutes), while in other embodiments tasks may be sufficiently complex to take significant amounts of time (e.g., hours or days). In addition, while in some embodiments some or all of the tasks may include physical activities by one or more mobile task performers (e.g., to take and supply a specified type of picture), in other embodiments some of the tasks may be a cognitive task that uses cognitive and/or other mental capabilities of mobile task performers.

The task exchange server further performs a variety of additional activities to facilitate the performance of mobile tasks. For example, the task exchange server may track the locations of mobile task performers (e.g., via the mobile device, RFID tags associated with the mobile task performers or their equipment, GPS ("Global Positioning System") tracking of a vehicle of the mobile task performer etc.), and may further take various actions corresponding to the tasks (e.g., sending notifications of new tasks based on the changed geographical location or based on the direction of travel to mobile task performers). As a second example, in some embodiments, the task exchange server may also track the current characteristics of a mobile device (e.g., via a program running on the mobile device) associated with a mobile task performer. In addition, the mobile task exchange server may also track the progression of the tasks through various states (e.g., an "open" state for tasks that are available to be performed, a "hold" state for tasks sent to a particular mobile task performer but not yet assigned to the mobile task performer, an "assigned" state for each assignment of a task to one or more mobile task performers, a "completed" state for an assignment after the mobile task performer provides the results of performance of the task, etc.), and may further take various actions corresponding to the tasks (e.g., send notifications to the task requester on the status of the task requested). In addition, in some embodiments a task requester may specify various actions associated with task performance (e.g., payment of a specified fee or other reward under specified conditions), and if so the mobile task exchange server may initiate those actions as appropriate for the task. Similarly, mobile task performer users may specify various actions related to tasks, such as to request that information about available tasks be provided in various ways (e.g., to be notified in a particular manner when specified types of tasks in a certain geographical location become available regardless of current geographical location), and if so the task exchange server may similarly initiate those actions as appropriate.

In some embodiments, the task exchange server further provides a variety of types of functionality related to obtaining and using information about qualifications and other attributes of mobile task performer users and/or task requester users, such as to allow users to identify and/or specify types of users with whom to conduct transactions. For example, the task exchange server may track various information about activities by mobile task performer users and/or task requester users in some embodiments, such as to automatically generate quantitative measurements of actions taken by the users that may be used as qualifications (e.g., activities related to prior task performance). More generally, in some embodiments the task exchange server may support user qualifications of various types (e.g., qualifications for a user that are asserted by that user, that are specified by one or more other users, qualifications related to the capabilities of a mobile device and/or that are automatically generated by the task exchange server). Similarly, in some embodiments, the task exchange server may also provide a variety of types of functionality related to obtaining and using information about attributes of mobile devices associated with mobile task performers. For example, the mobile task exchange server may track information about the current mode of the mobile device such as whether the device is currently in vibration mode (e.g., potentially indicating the unavailability of the mobile task performer or undesirability of contacting the mobile task performer).

Interactions between the task exchange server and users of the marketplace can occur in a variety of ways. In some embodiments task requesters may interact with the task exchange server in a programmatic manner, such as by invoking defined APIs of the marketplace (e.g., APIs based on Web services provided by the task exchange server) to send messages that request or supply information. In addition, in some embodiments, the task requesters may send various types of electronic messages (e.g., SMS (or "Short Message Service") messages, emails, automated telephone calls, etc.) from a mobile device to request a task to be performed. The defined APIs may allow the task requesters to not only submit tasks that are available to be performed, but also to perform various other actions with respect to previously submitted tasks (e.g., check on the status of pending tasks, modify information about pending tasks, submit instructions regarding handling of pending tasks, and obtain results for some types of tasks). In addition, the defined APIs may allow task requesters to further perform various other types of interactions with the task exchange server, such as searching for and/or browsing for information of interest (e.g., to identify available mobile task performers located in a specified geographical location, or to identify information about tasks submitted by other task requesters), supplying geographical location information for themselves, etc. In addition, while in some embodiments all communications between task requesters and mobile task performers occur via the mobile task exchange server, in other embodiments at least some communications may occur directly between a task requester and a mobile task performer (e.g., to allow a mobile task performer to obtain information from a task requester regarding a task to be performed, to allow a mobile task performer to perform a task, to update the geographical location of a mobile task requester, etc.) or more generally between any two or more users, such as after the task exchange server facilitates that direct communication (e.g., by providing appropriate contact or other communication-related information to at least one of the parties to the communication).

The mobile task exchange server may in some embodiments provide an immediate response that acknowledges receipt of the message (e.g., by providing a unique task identifier for a task being submitted), and may later provide one or more additional related electronic communications (e.g., to provide status information for a task, to provide the results from performing a task to the task requester who submitted the task). Such additional electronic communications can be performed in a variety of ways, such as by initiating a new electronic message (e.g., SMS, email, instant messaging, phone call, etc.), by using a callback mechanism supplied along with the original message, etc.

In at least some embodiments, the task exchange server may also provide an interactive console that allows task requesters to interactively perform some or all of the various types of actions previously noted, whether instead of or in addition to a programmatic interface that is provided for those actions. For example, in some embodiments the interactive console functionality may be accessed by a task requester user via a Web browser that interacts with a Web server for the task exchange server (e.g., by supplying appropriate information in a form on a Web page from the task exchange server).

In a similar manner, mobile task performer users may interact with the task exchange server in a variety of ways in order to identify available tasks of interest and to perform such tasks. More generally, mobile task performer users may similarly perform a variety of types of actions with respect to the task exchange server, including searching for and/or browsing for available tasks (e.g., on an associated mobile device or on a fixed location computing device) for which they are qualified and within a predetermined distance from searching for and/or browsing for tasks in a certain geographical location, supplying information about mobile device characteristics, requesting assignments for available tasks of interest, supplying results (if any) from performance of tasks to which they have been assigned, requesting notifications of later-submitted tasks for which they are qualified and generally in the current geographical area for the task (e.g., a predetermined number of miles away), turning off notifications of later-submitted tasks, providing various types of preference information, etc. Some of the information may be specified when a mobile task performer registers with the mobile task exchange server. Additional details regarding specific types of interactions with the mobile task exchange server by task requester and mobile task performer users are discussed in greater detail elsewhere.

As previously mentioned, in some embodiments some or all of the mobile task performers have one or more mobile devices. A mobile device includes, but is not limited to, a portable email device, personal digital assistant, cell phone, smart phone, satellite phone, palmtop computing device, laptop, game console, and media player. The mobile device may be capable of two-way communication although communication with a mobile device may not always be possible (e.g., the mobile device may need an accessory to perform communications capabilities, the mobile device may be out of range of the communication signal, etc.). The mobile device may also have capabilities to determine its current location such as via GPS, signal triangulation, or an ability to transmit information about the location of a fixed antenna currently used for communicating with the mobile device; however in other embodiments the location of the mobile task performer may be determined in other ways (e.g., supplied by the mobile task performer). A mobile task performer may also have other equipment that is utilized to perform a task. For example, if the mobile task was to have a pizza delivered, then the mobile task performer may have a vehicle.

Each mobile device may have various characteristics including static characteristics and dynamic characteristics. Static characteristics are those characteristics that change infrequently (e.g., require a firmware upgrade or adding an additional accessory to the mobile device) if at all and include the capabilities of the mobile device. For example, the capabilities of a mobile device may include playing audio or video recordings (e.g., J2ME, BREW, .NET Mobile), QWERTY keyboard for data entry, software platform availability, camera, walkie-talkie functionality, messaging functionality, web access and browser support. Dynamic characteristics, on the other hand, change frequently, such as battery power, memory left, signal strength, communication methods currently available, on/off status, and currently active user interaction mode (e.g., vibration mode, silent mode, airplane mode, etc.). A collection of the dynamic characteristics provide a mobile context for the mobile device.

Communications to or from the mobile device may be performed in various manners depending on the capabilities and type of mobile device used by the mobile task performer. For example, a laptop may use Wi-Fi (e.g., IEEE 802.11b, 802.11g, 802.11n) or WiMax (IEEE 802.16) while a cell phone may use GPRS ("General Packet Radio Service"), GSM ("Global System for Mobile Communications"), or CDMA ("Code division multiple access"). In some embodiments, the mobile task performer may be called by the task exchange server and interactive voice recognition used to notify mobile task performers of available tasks. However, the described techniques are communication means independent and may be applied to any suitable communication means.

Figure 3:
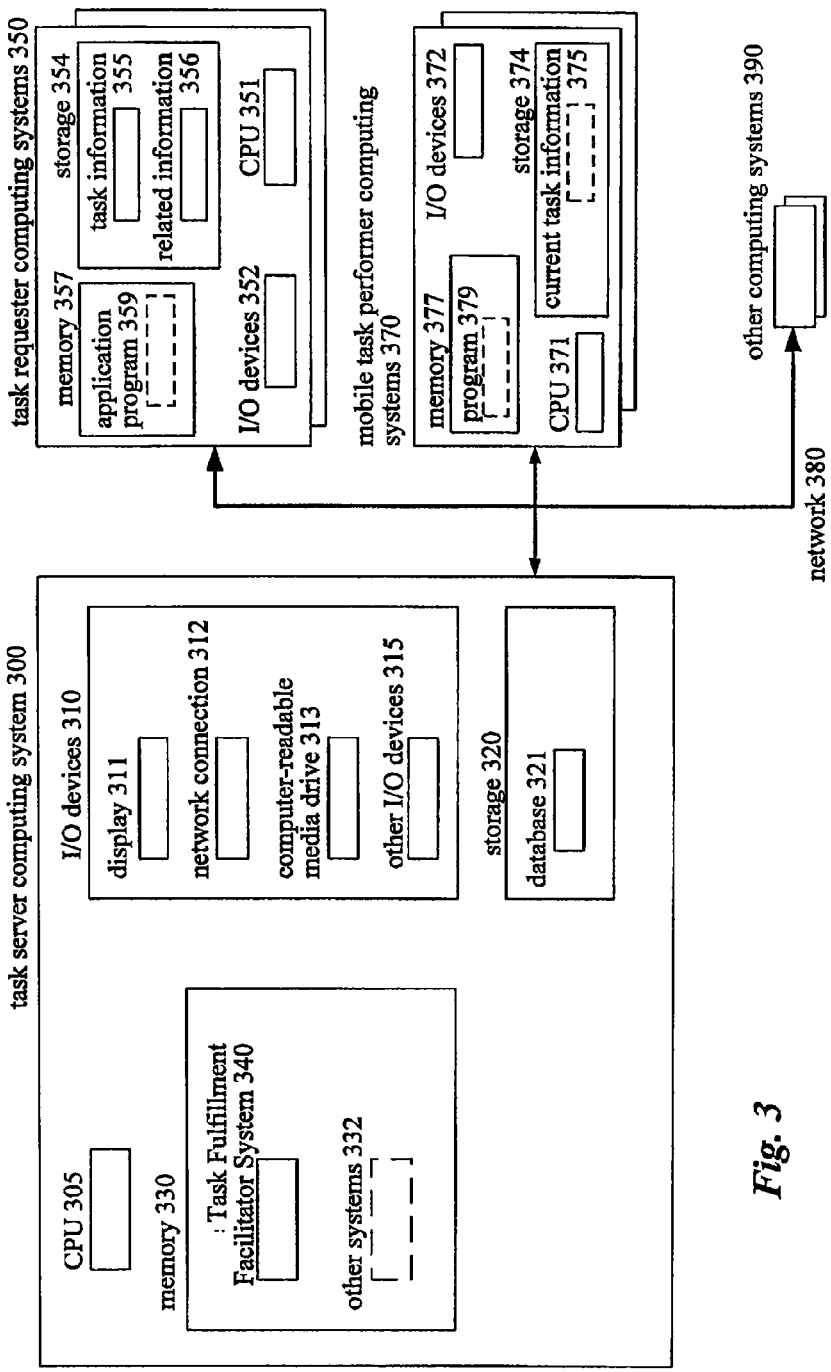
FIG. 3 is a block diagram illustrating an example computing system suitable for performing at least some of the described techniques.

FIG. 3 illustrates a server computing system 300 suitable for executing an embodiment of the TFF system facility that provides a mobile task exchange server, as well as various task requester computing systems 350, mobile task performer computing systems 370, and other computing systems 390. In the illustrated embodiment, the server computing system 300 includes a CPU 305, various I/O devices 310, storage 320, and memory 330. The I/O devices include a display 311, a network connection 312, a computer-readable media drive 313, and other I/O devices 315.

An embodiment of the TFF system 340 is executing in memory, and it interacts with the other computing systems over the network 380 using the network connection 312 (e.g., via the Internet and/or the World Wide Web, cell network, telephone network, etc.). In particular, users of task requester computing systems 350 may interact with the TFF system in order to provide information about available tasks to be performed, such as by using application program 359 executing in memory 357 to send stored task information 355 (e.g., information about the task, any associated geographical location, any associated criteria, any reward for successful performance, etc.) and related information 356 (e.g., format information of a response, an identifier for an item to be picked up, etc.) on storage 354. Mobile task performer users similarly use mobile task performer computing systems 370, such as one or more mobile devices associated with the mobile task performer, to interact with the TFF system, such as program 379 (e.g., a browser, a custom mobile application) in memory 377 to obtain information about available tasks, supply context information about the mobile device, and provide results information, if any, for performed tasks. When information is received at the computing system 370 about available tasks, the information is stored in this example embodiment with current task information 375 in storage 374 (e.g., temporarily until performance of the task is completed). In other embodiments, the mobile task performer may use a fixed location computer as the mobile task performer computing system 370 and after obtaining a task, travel to a nearby location to perform the task.

The TFF system and its modules (illustrated in FIG. 1B) may also access and use various task-related and user-related information on storage 320 or elsewhere, such as information stored in one or more databases 321 (e.g., the databases illustrated in FIG. 1B). In addition, in some embodiments the TFF system may also interact with other optional systems 332 executing in memory 330 and/or other optional computing systems 390 to perform additional related functionality, such as to perform payment processing in order to provide payments or other rewards to mobile task performers on behalf of task requesters and/or to obtain non-mobile related tasks from a general task exchange server.

Those skilled in the art will appreciate that computing systems 300, 350, 370 and 390 are merely illustrative and are not intended to limit the scope of the present invention. The TFF system may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" computing system or device may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the discussed TFF system modules may in some embodiments be combined in fewer modules or distributed in additional modules. Similarly, in some embodiments, the functionality of some of the modules may not be provided as part of the TFF system and/or other additional functionality may be available.

Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing system via inter-computer communication. Some or all of the system modules and/or data structures may also be stored (e.g., as software instructions or structured data) on a computer-readable medium, such as a hard disk, a memory, a network, or a portable media article to be read by an appropriate drive or via an appropriate connection. The system modules and data structures can also be transmitted via generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
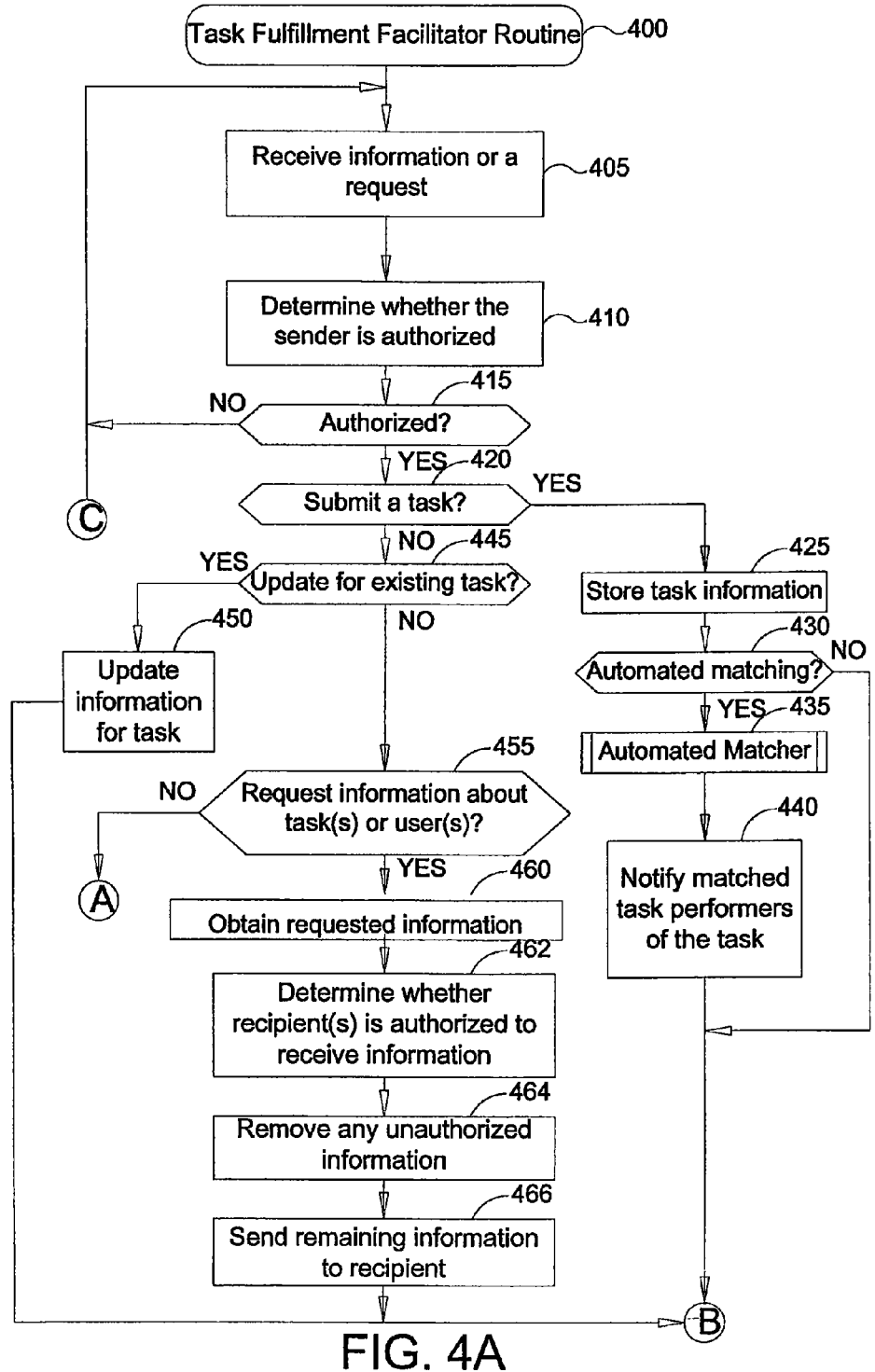
FIGS. 4A and 4B are a flow diagram of an example embodiment of a Mobile Task Fulfillment Facilitator routine.
Figure 4B:
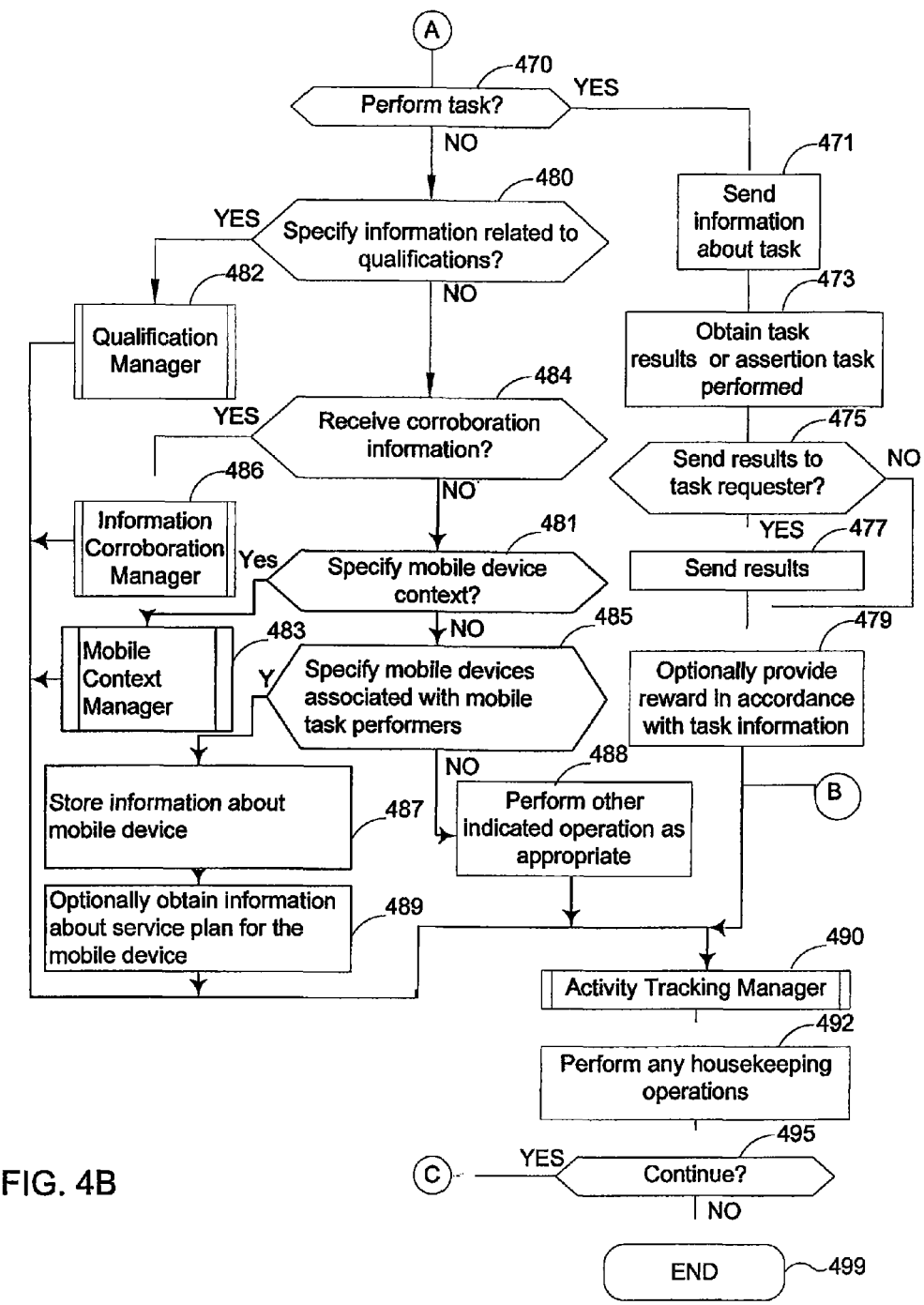

FIGS. 4A and 4B are a flow diagram of an example embodiment of a Task Fulfillment Facilitator routine 400. The routine may be provided by, for example, execution of an embodiment of the TFF system 130 of FIGS. 1A and 1B and/or of TFF system 340 of FIG. 3, such as to in this illustrated embodiment provide a task exchange server by interacting with task requesters and mobile task performers as appropriate to facilitate performance of tasks, as well as to optionally interact with other third-party systems as appropriate.

The routine begins in step 405, where an indication is received of information or a request, and in step 410 determines whether the sender of the information or request is authorized to perform requests of that type or provide information of that type, such as based on previously defined access controls for specific users or types of users. For example, if a request is received in step 405 from a user related to performance of a task (e.g., a request for information about tasks available to be performed, or a request to perform a particular task), and the requested information is available to a user in the current embodiment only if the user is a registered task performer user, the routine may in such an embodiment determine in step 410 whether that user is already registered as a task performer user. Similarly, some types of information may be accepted only from registered task performer users, and/or some information and/or requests may only be accepted from registered task requesters. Furthermore, in some embodiments the determination of whether a sender is authorized may further be performed in a manner specific to the sender and the particular request or information received in step 405, such as to limit access to information about a particular task to only task performer users who have one or more qualifications that are required for the task. If the routine identifies the sender as authorized in step 415, the routine continues to step 420 to determine whether the received indication was a request to submit a task. If so, the routine continues to step 425 to store task information received in step 405, including any task criteria related to task performance (e.g., geographical location and/or device characteristics), information about any associated rewards for performance of the task, and any associated information to be analyzed, manipulated, or useful as part of performing the task (e.g., name or order number and location of pick-up for order being picked up for last mile delivery tasks).

The routine then continues to step 430 to determine whether to perform automated matching to identify mobile task performers who are appropriate to perform the task, such as based on the type of task submitted (e.g., a task that is associated with one or more particular geographic locations and/or with one or more particular current characteristics of a mobile device to be used as part of performing the task) and/or an explicit request by the submitter of the task, although in other embodiments such automated matching functionality may not be provided or may be automatically performed for all tasks. In the illustrated embodiment, if automated matching is to be performed, the routine continues to step 435 to execute an Automated Matcher routine, and then receives identifications from the Automated Matcher routine of any identified mobile task performers. The routine then notifies those identified mobile task performers of the task in an appropriate manner (e.g., based on previously specified user preferences for those mobile task performers) in step 440. After step 440, or if it was instead determined in step 430 that automated matching was not to be performed, the routine continues to step 490.

If it was instead determined in step 420 that the received indication was not to submit a task, the routine continues instead to step 445 to determine whether a request was received to perform an update for an existing task, and if so continues to step 450 to perform the update as appropriate. Such updates may take a variety of forms, such as to modify information about or delete a pending task that has not been performed, to perform an indicated activity related to a task (e.g., to cause a reward to be provided to a mobile task performer after the task requester has reviewed and accepted the task results), etc. If it was instead determined in step 445 that the received indication was not to update an existing task, the routine continues to step 455 to determine whether the received indication was a request for information about one or more tasks and/or one or more users, such as for a search or browse request (e.g., from a fixed location computer), a request for detailed information about a particular task or user, a request for summary or aggregate information about some or all types of tasks and/or users, etc. If so, the routine continues to step 460 to identify and obtain the requested information, and then continues to step 462 to determine whether the indicated recipient of the information is authorized to receive all of the obtained information, such as based on access controls associated with any aspects or elements of the obtained information (although in other embodiments the access determination may be made before or as part of the obtaining of the information, such as in step 410). In step 464, the routine then removes any information for which the recipient is not authorized, and in step 466 sends any remaining information to the recipient. In some embodiments, indications may be provided to the recipient of any removed information for which they were not authorized (e.g., by displaying an icon or indicating a not authorized message), while in other embodiments such indications may not be provided. While not illustrated here, in some embodiments the information that is identified in step 460 and provided to a recipient in step 466 may further include information about tasks that are automatically identified as being appropriate for the recipient, such as if the recipient is a mobile task performer user (e.g., if the request is for such automatically identified appropriate tasks, or if the information about automatically identified appropriate tasks is provided in addition to other requested information). For example, the identifying and providing of such appropriate task information may include performing automated matching and notification functionality similar to that described with respect to steps 435 and 440, such as by using previously stored or dynamically obtained information about the current context of the recipient and any mobile devices of the recipient (e.g., by using information received in step 405, by actively contacting one or more mobile devices of the recipient to obtain current context information, etc.). After steps 450 or 466, the routine continues to step 490.

If it was instead determined in step 455 that the received indication was not a request for information about tasks or users, the routine continues instead to step 470 to determine whether the received indication was a request from a mobile task performer to perform one or more tasks, such as an indicated task. If so, the routine continues to step 471 to retrieve and provide information about the task(s) to the mobile task performer in an appropriate manner (e.g., in a manner specified for the task, a cost-effective manner for the task performer), and in step 473 obtains results of performance of the task(s) or an assertion of completion of performance of the task by the mobile task performer. In some embodiments, at least some of the one or more tasks whose information is identified and provided in step 471 may be tasks that are dynamically and automatically identified as being appropriate for the mobile task performer (e.g., if the request to perform the one or more tasks is for such automatically identified appropriate tasks, or if the information about automatically identified appropriate tasks is provided in addition to other requested information). For example, the identifying and providing of such appropriate task information may include performing automated matching and notification functionality similar to that described with respect to steps 435 and 440, such as by using previously stored or dynamically obtained information about the current context of the mobile task performer and any mobile devices of the mobile task performer (e.g., by using information received in step 405, by actively contacting one or more mobile devices of the mobile task performer to obtain current context information, etc.). In step 475, the routine then determines whether to immediately send the task results to the task requester, such as based on information associated with the task and/or user preferences for the task requester. If so, the routine continues to step 477 to send the results. After step 477, or if it was instead determined in step 475 not to send the results to the task requester at this time, the routine continues to step 479 to optionally provide any reward associated with the task to the mobile task performer in accordance with the task information, such as if such rewards are to be provided automatically upon receipt of the task results. After step 479, the routine continues to step 490.

While the illustrated embodiment indicates a synchronous flow in which the routine waits for and obtains task results in step 473 after sending the task information in step 471, in other embodiments the routine could be structured in other manners, such as to continue with other processing while waiting for task results (if any) to be sent. In addition, in some situations mobile task performers may not provide task results for a task before they accept an assignment to perform the task. In addition, while not illustrated here, in other embodiments various types of notifications may be sent to task requesters related to their submitted tasks, such as when a task is assigned to a mobile task performer for performance and/or when an assigned task is withdrawn from a mobile task performer who has not completed the performance.

If it was instead determined in step 470 that the received indication was not to perform a task, the routine continues instead to step 480 to determine whether a request was received to specify information related to user qualifications, and if so continues to step 482 to execute a Qualification Manager routine to handle the qualification-related activities. If it was instead determined in 480 that the received indication was not to specify qualification-related information, the routine continues instead to step 484 to determine whether information or a request was received related to corroboration of user qualifications or other user information, and if so continues to step 486 to execute an Information Corroboration Manager routine to handle the corroboration-related activities. If it was instead determined in step 484 that the received indication was not related to corroboration, the routine continues instead to step 481 to determine whether information was received related to the mobile context of a specified mobile device and if so continues to step 483 to execute a Mobile Context Manager routine to handle the mobile context information. If it was instead determined in step 481 that the received information was not related to mobile device context information, the routine continues to step 485 to determine if the request was to specify mobile devices associated with the mobile task performer and if so continues to step 487. At step

487, the routine stores information about the mobile devices such as in the user's mobile device information DB 153 of FIG. 1B. After storing the information about the mobile devices, the routine in step 489 may optionally obtain information about the service plan for each of the new mobile devices and proceeds to step 490. If it was instead determined in step 481 that the received information was not related to specifying mobile devices for a mobile task performer, the routine proceeds to 488 to perform another indicated operation as appropriate, such as from a mobile task performer indicating a withdrawal from or abandonment of an assignment to perform a task, to specify various types of other user information (e.g., information related to a user's identity or attributes, information related to an account of a user with the TFF system, information related to specifying access controls for information and/or functionality, administrative requests related to system operations, requests for information related to monitoring performance of tasks or other operations of the system, etc.).

After step 488, the routine continues to step 490 to execute an Activity Tracking Manager routine to log information about activities that have occurred and to generate various types of review and summary aggregate information for the system related to tasks and users. After step 490, the routine continues to step 492 to perform any additional housekeeping operations, such as to take appropriate actions when events do not occur within specified periods of time (e.g., to withdraw assigned tasks from mobile task performers who do not timely perform the tasks, to provide rewards to mobile task performers for tasks that they have performed when task requesters do not timely reject the task results provided by the mobile task performers, etc.). After step 492, the routine continues to step 495 to determine whether to continue. If so, or if it was determined in step 415 that the sender was not authorized, the routine returns to step 405, and if not continues to step 499 and ends. While the illustrated embodiment may include tasks being specified one at a time, in other embodiments tasks may instead be specified in other manners, such as to allow multiple tasks to be submitted together (e.g., to allow for batch processing), whether or not those tasks are related to each other.

Figure 5:
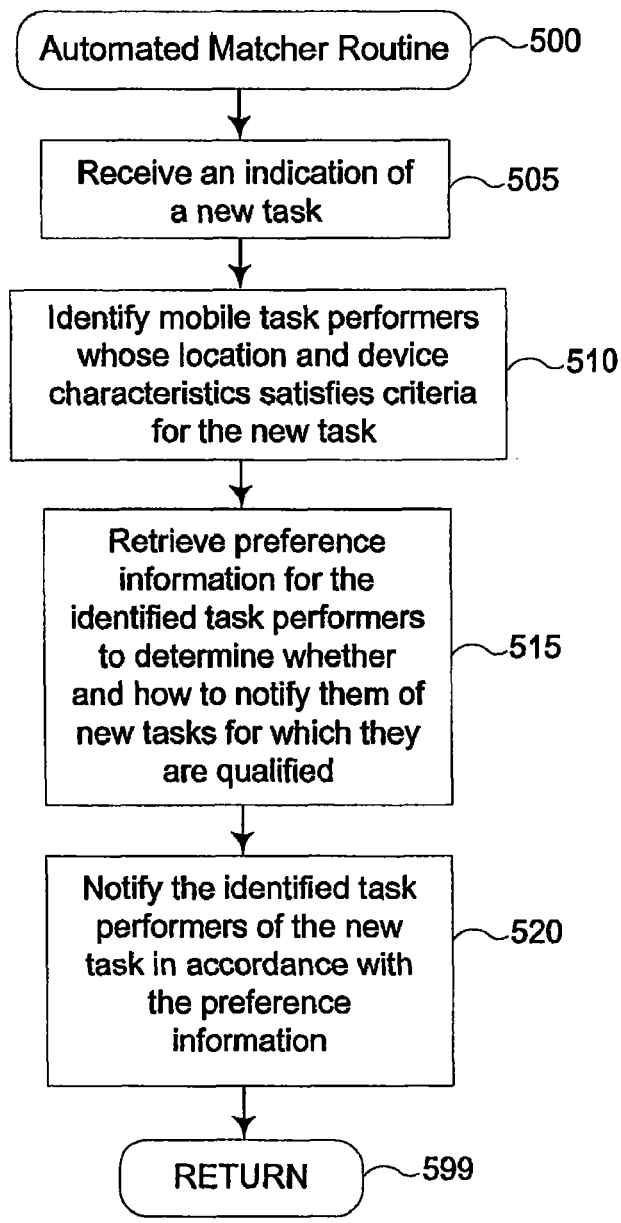
FIG. 5 is a flow diagram of an example embodiment of an Automated Matcher routine.

FIG. 5 is a flow diagram of an example embodiment of an Automated Matcher routine 500. The routine receives indications of new task requests and attempts to automatically match the tasks to appropriate mobile task performers. The routine may be provided by, for example, execution of an embodiment of the Matching Manager module 132 of FIG. 1B, such as may be invoked at step 435 of FIG. 4A. In some embodiments, the routine may be performed in response to receiving new submissions of some or all tasks and/or at other times (e.g., in response to requests to perform the matching, when a geographical location change is determined for a particular mobile task performer or mobile device, etc.). In addition, in some embodiments the automated matching may be performed in other ways, such as to receive an indication of one or more mobile task performers and/or mobile devices (e.g., new mobile task performers for the system, mobile task performers and/or mobile devices whose location has changed, mobile devices whose current characteristics have changed, etc.) and to match appropriate tasks to those performers and/or devices.

In the illustrated embodiment, the routine begins at step 505, where an indication is received of a new task. After receiving the indication of a new task, the routine proceeds to step 510, where the routine identifies one or more mobile task performers whose geographical location and device characteristics satisfy criteria for the new task. In some embodiment the matching of device characteristics may be performed without the routine understanding the meaning or context of device characteristics (e.g., based on identifying device characteristics from task criteria and for mobile devices associated with each of the mobile task performers that are of the same characteristic type and that have compatible values or ratings). The routine then continues in step 515 to retrieve preference information for the identified mobile task performers to determine whether and how to notify them of the new task. In step 520, the routine notifies the identified mobile task performers of the new tasks in accordance with the preference information. After step 520, the routine continues to step 599 and ends. While not illustrated here, in other embodiments the automated matcher routine could further automatically assign new tasks to one or more mobile task performers as appropriate, such as based on prior requests by the mobile task performers. Although not illustrated, additional factors such as other task criteria (e.g., qualifications, price) or task performer preferences may be used to match task performers and tasks.

In addition, in some embodiments the automated matcher routine may perform one or more of the indicated activities for a fee, such as from the task requester who supplied the new task and/or the mobile task performers who are notified of the task. While the illustrated embodiment may include tasks and tasks performers being matched one at a time, in other embodiments tasks may be instead matched to mobile task performers and/or mobile task performers may instead be matched to tasks in various other manners, such as to allow multiple tasks and mobile task performers to be matched together (e.g., to allow for batch processing) or matching a group of tasks to a geographical location as a matching intermediary to facilitate new matches for tasks when mobile task performers enter a new geographical location. In other embodiments, a similar routine (not shown) may be used to allow a mobile task performer to request tasks that are currently available to the mobile task performer.

Figure 6:
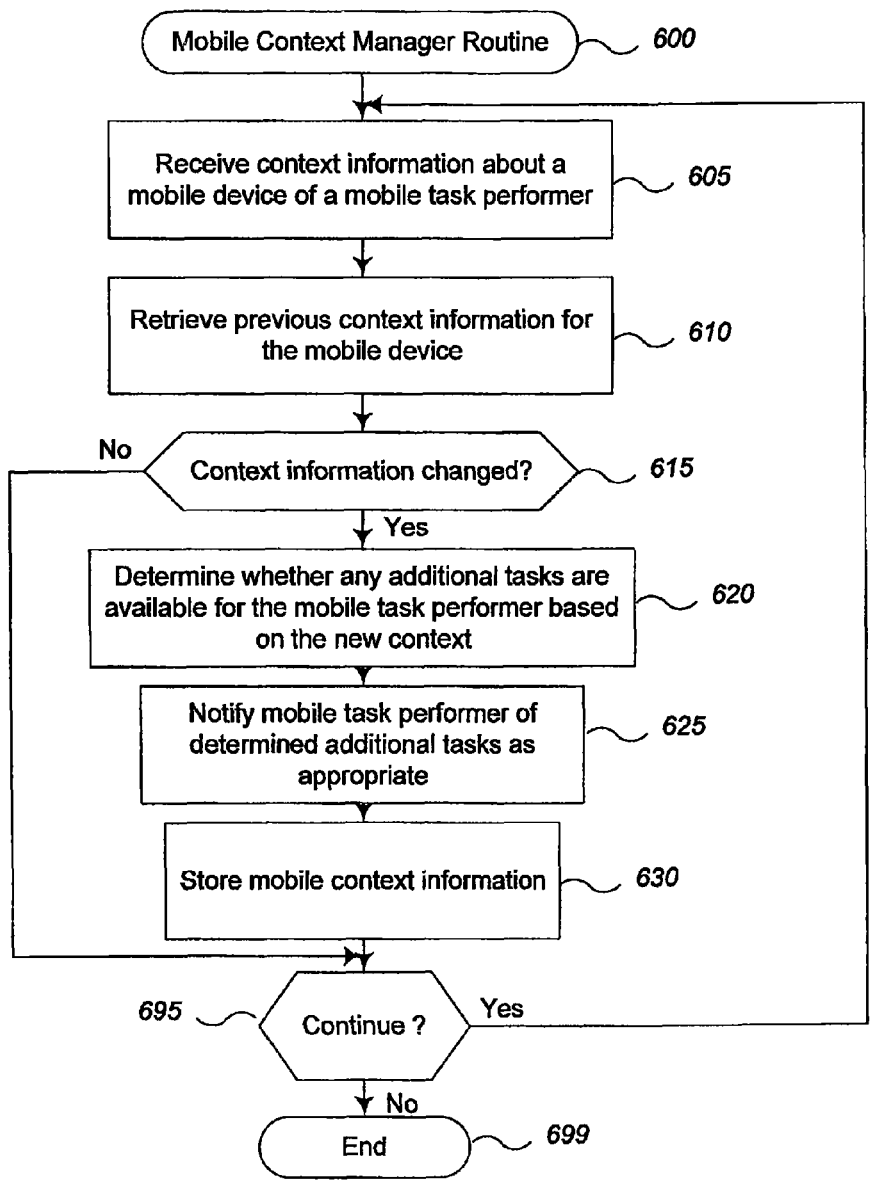
FIG. 6 is a flow diagram of an example embodiment of a Mobile Context Manager routine.

FIG. 6 is a flow diagram of an example embodiment of a Mobile Context Manager routine 600. The routine may be provided by, for example, execution of the Mobile Context Manager module 143 of FIG. 1B, such as may be invoked at step 483 of FIG. 4B. The routine obtains information about current characteristics of a mobile task performer user and/or one or more mobile devices of such a user, and determines whether additional tasks are now appropriate for the user and/or device(s) given a new context based on changes to the current characteristics. For example, if a mobile task performer moves from one geographical area to another, additional tasks may be made available to the mobile task performer (e.g., tasks that correspond to the new geographical area, or that were excluded from the prior geographical area). Similarly, if current characteristics change for a mobile device (e.g., the device has acquired a new high-speed data transmission signal), additional tasks may be available to the mobile task performer using the device (e.g., tasks that involve transferring a large amount of data in a short time).

The routine begins in step 605, where the routine receives context information about a mobile device of a mobile task performer. In some embodiments, the routine receives this information from a program (e.g., a J2ME application, a .NET Mobile application, BREW application) running on the mobile device while in other embodiments some or all of the information may be supplied by a communications carrier associated with the mobile device. After receiving the mobile context information, the routine proceeds to step 610, where it retrieves previous context information for the mobile device such as from the mobile device context information database 152 of FIG. 1B. Subsequently, the routine in step 615 determines if the context information has changed. If so, the routine proceeds to step 620 and if not to step 695. At step 620, the routine determines whether any additional tasks are available for the mobile task performer based on the new context. In the following step 625, the routine notifies the mobile task performer of the additional tasks as appropriate (e.g., based on the mobile task performer's preferences). After notifying the mobile task performer, the illustrated embodiment proceeds to step 630, where the mobile context information is stored, for example, in the mobile device context information database 152 of FIG. 1B. After storing the information, the routine proceeds to step 695. In step 695, the routine determines whether to continue and if so proceeds to step 605 otherwise the routine ends at 699.

In addition, in some embodiments each task may be a stand-alone activity that is unrelated to other tasks, while in other embodiments some tasks may each be a small part of a larger collective, such as to allow a large number of unrelated mobile task performers to perform a time-consuming collective task in parallel in a very short time (e.g., by having one mobile task performer to collect various items from various merchants and deliver it to a central location and another mobile task performer to provide the delivery from the central point to the task requester, by assembling a portfolio of photographs for a news-worthy event) from multiple task performers. Furthermore, the locations of mobile task performers may be tracked in some embodiments (e.g., to track if the task has been performed, provide new tasks based on direction of travel, etc.).

Various additional details regarding examples of the operation of embodiments of a task exchange server follow. Mobile task performer qualifications may also include various quantitative measurements by the mobile task exchange server of tracked activities of mobile task performers, including measurements related to a specific task, average and/or cumulative measurements over a specified group of multiple tasks and/or a specified period of time, and information about a rate of change for one or more measurements over one or more specified periods of time. A non-exclusive list of types of measurements that may be used in various embodiments include the number of tasks assigned to a mobile task performer, the number or percentage of tasks assigned to a mobile task performer that are completed, the number or percentage of tasks completed by a mobile task performer that are approved or rejected (e.g., by the task requester), the number or percentage of assigned tasks that are explicitly abandoned (or "dropped") by a mobile task performer before completion, the number or percentage of assigned tasks that are withdrawn from a mobile task performer before completion (e.g., by the mobile task exchange server for failure to complete the task within a specified time limit), the number or percentage of tasks that are offered to a mobile task performer that are refused (if an embodiment includes offering tasks to mobile task performers), an amount of time taken before performing assigned tasks (e.g., an average or distribution over time), etc. In some embodiments, task requesters may also be given qualifications based on quantitative measurements by the mobile task exchange server of tracked activities, such as the number of submitted available tasks from a task requester, the number or percentage of submitted tasks that are removed before assignment by a task requester, the number or percentage of completed tasks that are approved or rejected by a task requester, the number or percentage of submitted tasks that are modified by a task requester, the timeliness of a task requester in providing payment when due, etc. In addition, in some embodiments mobile task performers may be able to provide qualifications for task requesters by rating them, such as for mobile task performers that have been involved in performance of tasks submitted by those task requesters. Such ratings may be based on, for example, the reasonableness of the task requester in categorizing their submitted tasks, the reasonableness of the geographical location chosen for the task, the reasonableness of the capabilities of devices (including mobile devices) necessary to perform the task, in providing appropriate compensation for the level of task difficulty, in providing payment after satisfactory task results are provided, reasonableness of determining a satisfactory task result, etc.

In some embodiments, the mobile task exchange server may also provide rankings of mobile task performers relative to other mobile task performers on the basis of one or more of the various types of qualifications, and a task performer's ranking level could further be used as a qualification (e.g., a performer in the top 10% for a specified quantitative measurement). If the number of mobile task performers is low (e.g., less than 25), mobile task performers may not be ranked. More generally, in some embodiments, a performer's qualifications can include any information about a mobile task performer that can be measured or identified.

In addition, in some embodiments the activities of users with other systems may be used as qualifications or in other manners, such as based on importing data from such other systems. For example, in some embodiments the task exchange server system may be affiliated with or otherwise receive information related to shopping-related activities of users, such as with a Web retailer or other online merchant. Types of information that may be obtained and used from a retailer's system include the user's billing and/or shipping addresses, user's browsing history, search history, clickstream history, click-through history, purchase or rental history, payment and/or credit history, returns history, history of service-related activities (e.g., frequency and number of calls to customer service), use of discounts and purchase incentives, contributions of content and/or information (including various details about such contributions, such as length, subject matter, frequency of submission, quality as judged by other users, etc.) provided by the user (e.g., reviews of items, lists or groups of items of interest, etc.), participation in various community-based features, reputation within the system (e.g., based on voting or other rating by other users), etc. As a second example, in some embodiments the task exchange server system may be affiliated with a more general mobile task exchange server. Types of information that may be obtained from a more general mobile task exchange server include types of tasks performed, qualifications, rankings, task subscriptions, percent of tasks completed satisfactorily, percent of assigned tasks performed, bonuses awarded, total amount earned, average time to complete task, etc. Similarly, in some embodiments, qualification and other information from the task exchange server system may be able to be exported to other systems for use by those other systems. In addition, when such types of information are available, they can also be used in other ways.

Information about qualification-related activities can also be tracked and stored in various ways. For example, performance-related qualification scores could be tracked for all tasks, regardless of task type and/or required qualifications. Alternatively, activities could be tracked for particular types of tasks or groups of related tasks (e.g., to determine that a mobile task performer completes tasks with qualification 'A' 95% of the time but completes tasks with qualification 'B' only 50% of the time, to determine percent of time mobile task performer will travel 10 miles or more). Similarly, activities could be tracked for categories of tasks, such as to determine that a mobile task performer completes 'delivery' tasks correctly 100% of the time, but only completes 'photography' tasks satisfactorily 50% of the time.

Task requesters can also specify a variety of other types of criteria for tasks. For example, in some embodiments task requesters may specify criteria related to when a task is to be performed, such as an expiration time period for initial assignment to a mobile task performer and/or an expiration time limit for a mobile task performer to provide results of task performance or perform the task after a task has been assigned to them. If the task produces results, a task requester may also in some embodiments specify information about a format in which results are to be supplied, including by supplying information to the mobile task performer related to the results format (e.g., a WML-based response form to be completed by the mobile task performer, or an executable results program (e.g., a J2ME, Brew or .NET Mobile application) that the mobile task performer is to use to provide results and/or to perform the task). The various types of criteria can also be specified in various forms, including as an exact match and as a minimum or maximum threshold, and for various activities related to a task (e.g., to allow task assignment; to verify performance results as being satisfactory; to determine whether a value of a task performer's qualification is sufficient, such as based on a generated confidence level or value for appropriateness of the qualification value; to determine if a mobile task performer's location is sufficiently close to be available to the mobile task performer). Some thresholds may also be specified by other users (e.g., mobile task performers) and/or automatically by the task exchange server system in other situations and embodiments.

In addition, in some embodiments task requesters may supply additional task-related information to assist the task exchange server system and/or mobile task performers in identifying appropriate or interesting tasks, such as one or more categories for the task (e.g., based on a type of the task) and/or one or more keywords corresponding to the task. Such category and/or keyword information can then later be used to allow mobile task performers to subscribe to tasks based on the category and/or keyword information and geographical location. In addition, in some embodiments, the category and/or keyword information may be used by mobile task performers when searching for and/or browsing for tasks of interest. In other embodiments, such category and/or keyword information may instead be automatically generated by the mobile task exchange server based on analysis of information related to the task (e.g., by using a textual description of the task provided by the task requester, by using historical information about tasks supplied by task requesters, by using information that is supplied with the task to be analyzed, by using information about criteria specified for the task, etc.).

As previously noted, in at least some embodiments the task requests may also each specify one or more fees to be paid by the task requester to one or more mobile task performers for successful performance of a task. In such embodiments, the fee can be specified to be paid under any of a variety of circumstances, including in a manner related to a specified state of a task (e.g., to the first mobile task performer whose performance results are explicitly accepted by the task requester, to the first mobile task performer whose performance results are automatically accepted by the mobile task exchange server, to the first mobile task performer to whom a requested task is assigned, etc.). In other situations, multiple mobile task performers may receive payment for performance of a task, such as the first X mobile task performers that provide results (where X is a specified number by the task requester).

In other embodiments, payment for task requests can be determined in other ways, such as based on bidding by mobile task performers (e.g., as part of a standard or Dutch auction), as a variable rate that is dependent on a degree or amount of success in providing satisfactory performance results, etc. In addition, in some embodiments the task requester may allow the mobile task exchange server to specify the associated payment for a task (e.g., for a fee), such as based on a category of the task, on dynamic pricing based on current conditions at the time of task request, as part of a premium service for which the mobile task exchange server guarantees some aspects of the results (e.g., a maximum time to receive performance results, a minimum level of performance results, etc.). Moreover, in some embodiments the system provides information to task requesters to assist them in manually pricing tasks, such as by providing historical pricing information for tasks of the same type or for other related tasks, by providing summary information about current pricing and current pricing trends, etc.

After payment is determined to be provided to one or more mobile task performers for a task, the payment can be made in a variety of ways. In some embodiments the mobile task exchange server or an associated system may provide accounts to task requester and/or mobile task performer users, and if so payments may be made from those accounts of task requesters and/or to those accounts of mobile task performers.

As another example, for some types of tasks (e.g., a task to take the picture of a news-worthy event, the task requester may desire responses from multiple mobile task performers (e.g., to receive more than one angle of the newsworthy event), and if so may allow a specified number of simultaneous assignments (e.g., corresponding to the number of desired responses). In such situations the multiple mobile task performers can be paid in various ways, such as to provide the same payment to all mobile task performers who provided results, to provide payment only to mobile task performers whose results were determined to be accurate or otherwise used (e.g., based on them being in a majority of the results), to pay differing amounts to different mobile task performers (e.g., based on determined accuracy of the results, or promptness of providing the results, based on distance traveled, based on qualifications), etc.

In some embodiments after task performance results are provided by mobile task performers, the task requesters for those tasks may further be queried to provide human-generated ratings for the mobile task performers (e.g., for use in qualification determinations for those mobile task performers), such as related to adequacy and timeliness of the performance or performance results, while in other embodiments the mobile task exchange server could instead receive any such feedback information from the task requesters even when not explicitly solicited. Similarly, in some embodiments mobile task performers may provide rating and other feedback information for task requesters that may be used for qualification determinations for those task requesters (whether in response to queries or otherwise), such as related to promptness and adequacy of payment, sufficiency of the description of the task, sufficiency of directions to a location, number of communications with the mobile task performer, etc.

In embodiments in which quantitative measurements are made of mobile task performers and/or task requesters, such as the location of the mobile task performer, dynamic characteristics of a mobile task performer's mobile device or as qualifications for those users, the mobile task exchange server system further performs a variety of types of tracking activities in order to gather information for those quantitative measurements. For example, in some embodiments each activity of a mobile task performer and/or task requester relative to a task is recorded and can be used as a quantitative measurement. In addition, at least some such tracking information can also be used for other purposes in at least some embodiments, such as to determine availability of and load on the mobile task exchange server (e.g., to determine whether additional computing resources are needed or whether current computing resources are underutilized). In some embodiments, the task exchange server system may track the location of the mobile task performer to predict a geographical location the performer may be in the future and may then offer the mobile task performer a task to be performed in the future geographical location.

In addition, in some embodiments and/or for some types of tasks (e.g., tasks for which a task requester has requested and/or purchased an enhanced, or "concierge," level of service), the system may facilitate task performance by attempting to locate a mobile task performer to perform the task in various ways. For example, the system may in some embodiments assist mobile task performers to enhance their qualifications, such as by recommending to them to acquire new qualifications (e.g., based on current and/or projected demand for qualifications, or based on comparisons to other similar mobile task performers with whom they may be competing for tasks), and may further assist the mobile task performers in acquiring the new qualifications in some embodiments (e.g., by offering a qualification test to acquire the qualification, providing information on how to acquire a qualification from a third-party qualification issuer (or "issuing entity"), etc.). Similarly, in some embodiments, the system may assist mobile task performers to enhance demand for their services such as by traveling to a new geographical location or upgrading equipment including mobile devices. When an exact match for a mobile task performer is not available, the system may also provide additional functionality to assist a task requester, such as to identify mobile task performers who are closest to being a match and providing a ranked list based on the closeness of those mobile task performers. The system may similarly rank tasks for mobile task performers (e.g., in response to a search) such as to identify the tasks that are the closest match and/or that possess other attributes of interest (e.g., having the highest reward, shortest distance to perform the task, least mobile communication expenses) first. In addition, the system may in some embodiments attempt to identify external sources of mobile task performers and encourage them to join the mobile task exchange server such as by providing a sign-up bonus.

In addition, while tasks may in some embodiments have associated categories and/or keywords that are supplied by task requesters, in other embodiments the mobile task exchange server system automatically categorizes tasks and/or generates keywords for tasks based on analysis of information about the tasks, such as by analyzing similarities in attributes using data mining, Bayesian-based analysis, and other related analyses techniques. In a similar manner, in some embodiments the mobile task exchange server may organize related mobile task performers and/or related task requesters into groups based on similarities in geographical location, mobile device characteristics, qualifications and other attributes. Such organization and categorization of tasks, mobile task performers and/or task requesters assists users of the mobile task exchange server and the task exchange server system in identifying tasks and other parties of interest.

In some embodiments each task may be a simple stand-alone activity for which a mobile task performer receives a task description and performs the task. In other embodiments, however, some of the tasks may have multiple stages and/or multiple related successive activities by the mobile task performer, including having multiple interactions (e.g., with the task requester and/or the task exchange server system) during and/or between the stages or successive activities. In such embodiments, rewards can be provided to a mobile task performer in various ways, such as based on completion of all stages/activities or instead based on completion of each of one or more intermediate stages/activities.

In at least some such embodiments, tasks may be submitted by one or more task requesters for performance by a group of multiple mobile task performers (e.g., by a specified group, by a group that has at least a minimum number of members and/or that has at most a maximum number of members, by a group that has one or more specified qualifications for the group, by a group that has members in more than one geographical location, by a group on the same mobile network, by a group using the same mobile device, etc.), and/or a group of multiple mobile task performers may accept one or more tasks for performance by one or more members of the group even if the task requesters had not specified that those tasks were for performance by a group. In addition, when multiple users work together as a group, the group may in some embodiments by treated by the task exchange server system in a manner similar to a single user, such as to allow the group to be issued qualifications and/or to have various types of associated information, as well as to in some embodiments automatically determined aggregate qualifications for a group based on the individual qualifications of group members or determine an aggregate geographical location of the group members.

While in some embodiments each of the task requesters may be unrelated to (and even unknown to) other task requesters, in other embodiments multiple task requesters may instead be affiliated or related to each other in various ways, such as by being part of a single organization, by working together (e.g., as a group) for some or all tasks to be performed (e.g., to coordinate performance requests for related tasks, such as by identifying them as being related and/or specifying criteria related to performance of a group of tasks), etc. In a related manner, in some embodiments groups of tasks may be identified as being related (e.g., based on indications received from the task requesters for the tasks, based on the geographical location to perform the task), such as to coordinate performance of the tasks in the group in various ways (e.g., by collecting or aggregating performance results for all of the tasks, by assigning them to one or more mobile task performers in a manner to facilitate the coordination of the performance, etc.). In addition, in some embodiments task requesters and/or mobile task performers may be recruited for participation in the system in a variety of ways, including on the basis of existing group membership or other affinity information (e.g., to identify people likely to have time to work as mobile task performers, such as based on their status as being potentially retired due to their membership in a seniors-oriented group; to identify people likely to have a useful qualification, such as based on their membership in a professional organization).

In some embodiments, additional security mechanisms are further employed to restrict access to at least some information for at least some users. For example, some information about tasks may not be made available to at least some mobile task performers, such as to hide information about the existence of tasks or about certain task details from mobile task performers who are not qualified to perform the task, to whom the task is outside the vicinity of the mobile task performer, to whom the mobile devices of a mobile task performer are not capable of assisting in the performance of the task, to whom the task is not assigned, or who otherwise meet criteria specified by a task requester. Furthermore, some information about a task may be made available to a potential mobile task performer only when certain conditions are satisfied, such as completion of a non-disclosure agreement or satisfaction of other specified criteria. Similarly, at least some information about the task requesters and/or mobile task performers may be hidden from at least some other mobile task performers and/or task requesters, such as to shield identities of users (e.g., to provide partial anonymity between a task requester who submits a task and a mobile task performer who performs the task, or to limit information about a mobile task performer or task requester to potential competitors), shield current locations of users, or to limit access to information about quantitative measurements or other qualifications in order to minimize attempts by participants in the marketplace to artificial manipulate rankings and other qualification information. In particular, in some embodiments at least some qualifications of mobile task performers may be private to the mobile task performers and/or to task requesters who issued those qualifications to those mobile task performers, such as to allow the task requesters to limit performance of their tasks to mobile task performers in a manner that is not visible to other mobile task performers who do not have those qualifications.

In some embodiments, the system further attempts to provide meta-information about other information in the system (e.g., results of task performance, appropriateness of a user's qualification, geographical location of user's, etc.), such as to provide a confidence value to a task requester regarding a likely appropriateness (e.g., estimated time to response, distance traveled by mobile task performer, etc.). Such confidence values may be generated or otherwise determined in various ways, including based on information provided by or otherwise associated with those users and/or based on information provided by or otherwise associated with other users.

In some embodiments, the system further assists task requesters to obtain performance of tasks in various ways, such as by providing insurance to recoup payments made for results that are not received or that turn out to be unsatisfactory, by providing an escrow service in which payments are held until they can be verified as satisfactory, by providing for appropriate contractual terms (e.g., binding arbitration) or other mechanisms to resolve disputes, etc. Some or all of these functionalities may be provided for a fee in some embodiments, such as a fee charged to the task requesters and/or to the mobile task performers involved in a transaction benefiting from the functionality provided. In addition, in some embodiments the system attempts to improve its performance over time by learning preferences of task requesters and/or mobile task performers and patterns of travel of mobile task performers, such as by monitoring their activities and/or gathering feedback from them regarding prior activities.

In addition, in some embodiments, a single task exchange server may support users in multiple geographical areas (e.g., an entire state, country, or group of countries), while in other embodiments some or all geographical area may have a distinct task exchange server specific to that area.

In addition, in some embodiments, the task exchange server may interact with or be part of a more generalized task exchange server, which may allow many human intelligent tasks to be performed by mobile task performers on their mobile devices even though the tasks are not related to the location of the mobile task performer. As an example of human intelligent tasks, the mobile task performer may analyze or supply information as part of a task. For example, the mobile task performer may determine if a message is spam, an image is pornographic, or proofread a small section of text or data. When information is to be analyzed as part of a task, that information can be provided to a mobile task performer in a variety of ways, such as from the task exchange server along with other task-related information, or by sending the information in one or more additional emails or messages to the mobile device. The tasks may be reformatted for use on mobile devices and some tasks may not be able to be performed using mobile devices (e.g., based on screen size restraints or bandwidth restraints).

The system and/or the described techniques can also be used in other manners in some embodiments. As previously noted, the system may export various information in some embodiments for use by other systems, such as user's current geographical location, user's mobile device characteristics, user qualification information and other types of user information. In addition, use of qualification information may be used for purposes of social or business networking in some embodiments, such as by submitting tasks having qualification criteria intended to match users whose qualifications satisfy the qualification criteria and are in a specified geographical location—in this example, the task may be performed by identifying the one or more mobile task performers who satisfy the task's associated qualifications or other criteria. In a similar manner, users matching specified criteria could similarly be found for other purposes in other embodiments, such as to identify appropriate users for a research study, polling, opinion taking, surveys, etc.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing, it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for facilitating performance of tasks from task requesters by mobile human task performers, the method comprising:

receiving information about multiple mobile human task performers who are available to perform tasks in multiple geographic locations, the received information for each of the mobile human task performers indicating a current geographic location of the mobile human task performer and one or more mobile devices of the mobile human task performer that are available for use in performing tasks;

receiving information from multiple task requesters about multiple tasks that are available to be performed, each of the tasks having criteria for performance of the task that includes a geographic location of a mobile human task performer who performs the task and that includes one or more capabilities of a mobile device of the mobile human task performer who performs the task; and for each of at least some of the multiple tasks,
automatically identifying a mobile human task performer who is capable of performing the task in accordance with the criteria for the task, the automatic identifying being performed by a configured computing system and including determining that the current geographic location of the mobile human task performer is within a predetermined distance from the geographic location for the task and including determining that the one or more mobile devices of the mobile human task performer have the one or more capabilities for the task;

sending information about the task to the identified mobile human task performer via at least one of the mobile devices of the identified mobile human task performer, the sending being performed by the configured computing system; and after the sending of the information, receiving information from at least one of the mobile devices of the identified mobile human task performer that the task has been performed by the identified mobile human task performer.

2. The method of claim 1 wherein, for each of one or more of the at least some multiple tasks, performance of the task by a mobile task performer user involves using as part of the performance the one or more mobile device capabilities included in the criteria for performance of the task.

3. The method of claim 1 wherein at least some of the mobile human task performers each have one or more associated qualifications, wherein the criteria for performance of one of the at least some tasks includes one or more associated required qualifications for a task performer who performs the one task, and wherein the identifying of a mobile human task performer who is capable of performing the one task includes determining that the mobile human task performer has the one or more associated required qualifications.

4. The method of claim 1 wherein, for one or more of the at least some tasks, the identifying of the mobile human task performer who is capable of performing the task includes identifying multiple human task performers and the sending of the information about the task is performed for each of the multiple identified human task performers, and wherein the method further comprises assigning each of the one or more tasks to one of the multiple human task performers to whom information about the task is sent based at least in part on an indication received from the one human task performer that the one human task performer has accepted the task.

5. The method of claim 1 wherein, for one or more of the at least some tasks, the sending of the information about the task to an identified mobile human task performer is sent via one or more electronic messages of one or more types that include at least one of email, short message service, enhanced messaging service, multimedia messaging service, instant message, RSS (Really Simple Syndication) feed communication, and automated telephone message.

6. The method of claim 1 wherein at least some of the mobile human task performers repeatedly move to new geographic locations, and wherein the determining that a current geographic location of the mobile human task performer is within a predetermined distance from the geographic location for a task includes tracking a current geographic location of the mobile human task performer based on information automatically obtained from one or more mobile devices of the mobile human task performer.

7. The method of claim 1 wherein, for one of the at least some tasks, the identifying of the mobile human task performer who is capable of performing the one task is performed in response to a request from that mobile human task performer for information about one or more tasks, the request indicating the current geographic location of the mobile human task performer and current capabilities of at least one mobile device of the mobile human task performer.

8. The method of claim 1 wherein, for one or more of the at least some multiple tasks, the sending of the information about the task to an identified mobile human task performer includes temporarily reserving availability to perform the task for the identified mobile human task performer such that other mobile human task performers cannot perform the task while the task is reserved.

9. The method of claim 1 wherein the multiple tasks that are available to be performed are of multiple types, wherein the mobile devices of the multiple mobile human task performers are of multiple types, and wherein, for at least one of the multiple types of tasks and one of the types of mobile devices, the receiving of information that a task of one of the at least one types has been performed includes receiving results of performance of that task from a mobile device of the one mobile device type.

10. The method of claim 1 wherein the configured computing system provides a task fulfillment facilitator system that facilitates transactions between task requesters having tasks to be performed and task performers able to perform tasks, the facilitating of transactions include providing information about tasks to additional human task performers that perform work for a single location and receiving results of performance by at least some of the additional human task performers, the facilitating of transactions further including providing compensation to mobile human task performer and to additional human task performers who satisfactorily perform tasks.

11. A computer-implemented method for facilitating performance of tasks by mobile task performers, the method comprising:

receiving information from a task requester about an indicated task that is available to be performed by one or more human task performers, the indicated task being associated with one or more geographic locations and having one or more associated criteria related to performance of the indicated task;

automatically identifying at least one of multiple possible human task performers for the indicated task, the automatic identifying being performed by a configured computing system and including:
  determining current geographic locations of the at least one human task performers, one or more of the at least one human task performers being mobile task performers whose current locations change as the mobile task performers move;
  determining that the current geographic locations of the at least one human task performers each correspond to at least one of the associated geographic locations for the indicated task; and
  determining that performance of the indicated task by the at least one human task performers would satisfy the one or more associated criteria for the indicated task; and
after the automatic identifying, providing an indication of the indicated task to the identified human task performers to notify the identified human task performers of availability of the indicated task to enable one or more of the identified human task performers to perform the indicated task.

12. The method of claim 11 wherein at least some of the multiple possible human task performers each have one or more associated qualifications, wherein the one or more associated criteria related to performance of the indicated task includes one or more required qualifications for a human task performer who performs the task, and wherein the determining that performance of the indicated task by the at least one human task performers would satisfy the one or more associated criteria for the indicated task includes determining that each of the at least one human task performers has the one or more required qualifications.

13. The method of claim 12 wherein at least one of the one or more required qualifications includes an ability of a human task performer who performs the task to use one or more specified capabilities of a mobile device.

14. The method of claim 11 wherein each of the mobile task performers has one or more mobile devices at a current location of the mobile task performer, and wherein the providing of the indication of the indicated task to each of the identified one or more mobile task performers includes automatically sending one or more communications to at least one of the one or more mobile devices of that mobile task performer.

15. The method of claim 14 wherein the determining of the current geographical locations of each of at least one of the one or more mobile task performers includes determining the current geographical location of at least one of the one or more mobile devices of the mobile task performer.

16. The method of claim 14 wherein the at least one human task performers are the one or more mobile task performers, and wherein the automatic identifying of the at least one human task performers for the indicated task includes identifying the one or more mobile task performers based at least in part on capabilities of the mobile devices of the one or more mobile task performers.

17. The method of claim 16 wherein the capabilities of the mobile devices of the one or more mobile task performers include at least one of presenting audio information, presenting video information, recording audio information, recording video information, one or more indicated input devices, one or more indicated output devices, a capability to execute one or more indicated software programs, a capability to process one or more indicated types of data, and a capability to communicate in one or more indicated manners.

18. The method of claim 16 wherein the capabilities of the mobile devices of the one or more mobile task performers include digital camera capabilities.

19. The method of claim 16 wherein the capabilities of the mobile devices of the one or more mobile task performers include capabilities to receive one or more types of electronic messages.

20. The method of claim 16 wherein the one or more associated criteria related to performance of the indicated task include at least one of the capabilities of the mobile devices of the one or more mobile task performers.

21. The method of claim 14 wherein the at least one human task performers are the one or more mobile task performers, and wherein the automatic identifying of the at least one human task performers for the indicated task includes identifying the one or more mobile task performers based at least in part on current characteristics of the mobile devices of the one or more mobile task performers, the current characteristics including at least one of device power level, device transmission signal strength, one or more current interaction modes, communication service plan in use, and memory available.

22. The method of claim 14 wherein the one or more mobile devices of each of the mobile task performers include at least one of a portable email device, personal digital assistant, cellphone, smart phone, satellite phone, palmtop computing device, laptop computing device, tablet computer, portable game console, digital camera, and portable media player device.

23. The method of claim 11 wherein the determining of the current geographic location of each of one or more of the at least one human task performers involves receiving one or more indications from the task performer of the current geographic location of the task performer.

24. The method of claim 11 wherein the determining of the current geographic location of each of one or more of the at least one human task performers involves automatically tracking the current geographic location of the human task performer based on information received from one or more mobile devices of the human task performer.

25. The method of claim 11 wherein the current geographic location of a human task performer is determined to correspond to the at least one of the associated geographic locations for the indicated task if the current geographic location is within a predetermined distance of the at least one associated geographic locations.

26. The method of claim 11 wherein the current geographic location of a human task performer is determined to correspond to the at least one of the associated geographic locations for the indicated task if the human task performer is moving toward the at least one associated geographic locations.

27. The method of claim 11 wherein the indicated task includes a human task performer engaging in one or more activities at one or more of the at least one associated geographic locations for the task.

28. The method of claim 27 wherein the one or more activities include recording information about an indicated geographic location.

29. The method of claim 27 wherein the one or more activities include at least one of delivering a first indicated load to an indicated geographic location and of obtaining a second indicated load from an indicated geographic location, the indicated first and second loads each including one or more people and/or objects.

30. The method of claim 11 further comprising receiving results of performance of the indicated task from one of the identified human task performers, and providing compensation to the one human task performer for the performance.

31. The method of claim 11 further comprising receiving information about one or more mobile devices of each of at least one of the one or more mobile task performers from the mobile task performer as part of configuring interactions with the mobile task performer.

32. The method of claim 11 wherein the configured computing system provides an electronic task exchange server that facilitates transactions between task performers able to perform tasks and multiple unaffiliated task requesters having multiple available tasks of multiple types to be performed, some of the tasks not having associated geographic locations and at least some of the task performers not being mobile task performers.

33. The method of claim 32 wherein the method further comprises automatically determining tasks to make available to mobile task performers based at least in part on criteria associated with the tasks.

34. The method of claim 11 wherein the automatic identifying of the at least one possible human task performers for the indicated task includes identifying multiple possible human task performers who are alternative candidates to perform the indicated task, and wherein the providing of the indication of the indicated task to the identified human task performers includes notifying each of the multiple possible human task performers of the indicated task so as to enable a single one of the multiple possible human task performers to select to perform the indicated task.

35. A non-transitory computer-readable medium whose contents configure a computing system to facilitate performance of tasks by mobile task performers, by performing a method comprising:
   receiving information from a task requester about an indicated task that is available to be performed by one or more human task performers, the indicated task being associated with one or more geographic locations and having one or more associated criteria related to performance of the indicated task;
   automatically identifying at least one of multiple possible human task performers for the indicated task, the automatic identifying being performed by the configured computing system and including:
      determining current geographic locations of the at least one human task performers, one or more of the at least one human task performers being mobile task performers whose current locations change as the mobile task performers move;
      determining that the current geographic locations of the at least one human task performers each correspond to at least one of the associated geographic locations for the indicated task; and
      determining that performance of the indicated task by the at least one human task performers would satisfy the one or more associated criteria for the indicated task; and
   after the automatic identifying, providing an indication of the indicated task to the identified human task performers to notify the identified human task performers of availability of the indicated task to enable one or more of the identified human task performers to perform the indicated task.

36. The non-transitory computer-readable medium of claim 35 wherein at least some of the multiple possible human task performers each have one or more associated qualifications, wherein the one or more associated criteria related to performance of the indicated task includes one or more required qualifications for a human task performer who performs the task, and wherein the determining that performance of the indicated task by the at least one human task performers would satisfy the one or more associated criteria for the indicated task includes determining that each of the at least one human task performers has the one or more required qualifications.

37. The non-transitory computer-readable medium of claim 36 wherein at least one of the one or more required qualifications includes an ability of a human task performer who performs the task to use one or more specified capabilities of a mobile device.

38. The non-transitory computer-readable medium of claim 35 wherein each of the mobile task performers has one or more mobile devices at a current location of the mobile task performer, and wherein the providing of the indication of the indicated task to each of the identified one or more mobile task performers includes automatically sending one or more communications to at least one of the one or more mobile devices of that mobile task performer.

39. The non-transitory computer-readable medium of claim 38 wherein the at least one human task performers are the one or more mobile task performers, and wherein the automatic identifying of the at least one human task performers for the indicated task includes identifying the one or more mobile task performers based at least in part on capabilities of the mobile devices of the one or more mobile task performers.

40. The non-transitory computer-readable medium of claim 39 wherein the capabilities of the mobile devices of the one or more mobile task performers include at least one of presenting audio information, presenting video information, recording audio information, recording video information, one or more indicated input devices, one or more indicated output devices, a capability to execute one or more indicated software programs, a capability to process one or more indicated types of data, a capability to communicate in one or more indicated manners, a digital camera capability, and a capability to receive one or more types of electronic messages.

41. The non-transitory computer-readable medium of claim 38 wherein the at least one human task performers are the one or more mobile task performers, and wherein the automatic identifying of the at least one human task performers for the indicated task includes identifying the one or more mobile task performers based at least in part on current characteristics of the mobile devices of the one or more mobile task performers, the current characteristics including at least one of device power level, device transmission signal strength, one or more current interaction modes, communication service plan in use, and memory available.

42. The non-transitory computer-readable medium of claim 35 wherein the method further comprises receiving results of performance of the indicated task from one of the identified human task performers, and providing compensation to the one human task performer for the performance.

43. The non-transitory computer-readable medium of claim 35 wherein the configured computing system provides an electronic task exchange server that facilitates transactions between task performers able to perform tasks and multiple unaffiliated task requesters having multiple available tasks of multiple types to be performed, some of the tasks not having associated geographic locations and at least some of the task performers not being mobile task performers.

44. The non-transitory computer-readable medium of claim 35 wherein the automatic identifying of the at least one possible human task performers for the indicated task includes identifying multiple possible human task performers who are alternative candidates to perform the indicated task, and wherein the providing of the indication of the indicated task to the identified human task performers includes notifying each of the multiple possible human task performers of the indicated task so as to enable a single one of the multiple possible human task performers to select to perform the indicated task.

45. The non-transitory computer-readable medium of claim 35 wherein the contents are instructions that when executed program the computing device to perform the method, and wherein the computer-readable medium is a memory of the computing device.

46. A computing system configured to facilitate performance of tasks by mobile task performers, comprising:
one or more processors;
a first module that is configured to, when executed by the one or more processors, receive information from a task requester about an indicated task that is available to be performed by one or more human task performers, the indicated task being associated with one or more geographic locations and having one or more associated criteria related to performance of the indicated task;
a second module that is configured to, when executed by the one or more processors, automatically identify at least one of multiple possible human task performers for the indicated task, the automatic identifying including:
determining current geographic locations of the at least one human task performers, one or more of the at least one human task performers being mobile task performers whose current locations change as the mobile task performers move;
determining that the current geographic locations of the at least one human task performers each correspond to at least one of the associated geographic locations for the indicated task; and
determining that performance of the indicated task by the at least one human task performers would satisfy the one or more associated criteria for the indicated task; and
a third module that is configured to, when executed by the one or more processors, provide an indication of the indicated task to the identified human task performers to notify the identified human task performers of availability of the indicated task to enable one or more of the identified human task performers to perform the indicated task.

47. The computing system of claim 46 wherein at least some of the multiple possible human task performers each have one or more associated qualifications, wherein the one or more associated criteria related to performance of the indicated task includes one or more required qualifications for a human task performer who performs the task, and wherein the determining that performance of the indicated task by the at least one human task performers would satisfy the one or more associated criteria for the indicated task includes determining that each of the at least one human task performers has the one or more required qualifications.

48. The computing system of claim 46 wherein each of the mobile task performers has one or more mobile devices at a current location of the mobile task performer, and wherein the providing of the indication of the indicated task to each of the identified one or more mobile task performers includes automatically sending one or more communications to at least one of the one or more mobile devices of that mobile task performer.

49. The computing system of claim 48 wherein the at least one human task performers are the one or more mobile task performers, and wherein the automatic identifying of the at least one human task performers for the indicated task includes identifying the one or more mobile task performers based at least in part on capabilities of the mobile devices of the one or more mobile task performers.

50. The computing system of claim 46 wherein the determining of the current geographic location of each of one or more of the at least one human task performers involves receiving one or more indications from the task performer of the current geographic location of the task performer.

51. The computing system of claim 46 wherein the determining of the current geographic location of each of one or more of the at least one human task performers involves automatically tracking the current geographic location of the human task performer based on information received from one or more mobile devices of the human task performer.

52. The computing system of claim 46 wherein the current geographic location of a human task performer is determined to correspond to the at least one of the associated geographic locations for the indicated task if the current geographic location is within a predetermined distance of the at least one associated geographic locations and/or if the human task performer is moving toward the at least one associated geographic locations.

53. The computing system of claim 46 comprising one or more modules configured to receive results of performance of the indicated task from one of the identified human task performers, and provide compensation to the one human task performer for the performance.

54. The computing system of claim 46 wherein the computing system provides an electronic task exchange server that facilitates transactions between task performers able to perform tasks and multiple unaffiliated task requesters having multiple available tasks of multiple types to be performed, some of the tasks not having associated geographic locations and at least some of the task performers not being mobile task performers.

55. The computing system of claim 46 wherein the first, second and third modules each includes software instructions for execution by the one or more processors.

* * * * *